(12) United States Patent
Yasunaga

(10) Patent No.: US 7,944,575 B2
(45) Date of Patent: May 17, 2011

(54) IMAGE FORMING APPARATUS CLIENT/SERVER TYPE INFORMATION PROCESSING SYSTEM AND INFORMATION PROCESSING METHOD

(75) Inventor: Yutaka Yasunaga, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 948 days.

(21) Appl. No.: 11/812,916

(22) Filed: Jun. 22, 2007

(65) Prior Publication Data

US 2008/0068643 A1 Mar. 20, 2008

(30) Foreign Application Priority Data

Sep. 14, 2006 (JP) ................................. 2006-249015

(51) Int. Cl.
*G06F 15/00* (2006.01)
*G06F 15/16* (2006.01)
(52) U.S. Cl. ...................................... 358/1.15; 709/229
(58) Field of Classification Search ................. 358/1.15, 358/1.13, 1.14, 1.12, 1.1, 1.9, 3.13, 462, 358/538, 498, 2.99, 1.6, 468, 296; 717/173, 717/178, 170, 174, 120, 104, 140; 718/102, 718/103; 709/229, 225, 200, 230, 219, 203
See application file for complete search history.

(56) References Cited

U.S. PATENT DOCUMENTS

2004/0179223 A1* 9/2004 Iwase et al. ................... 358/1.13

FOREIGN PATENT DOCUMENTS

| JP | 2002-251674 | 9/2002 |
|---|---|---|
| JP | 2004-078849 | 3/2004 |

OTHER PUBLICATIONS

Japanese Office Action dated Oct. 1, 2008.

* cited by examiner

*Primary Examiner* — Saeid Ebrahimi Dehkordy
(74) *Attorney, Agent, or Firm* — Finnegan, Henderson, Farabow, Garrett & Dunner, L.L.P.

(57) ABSTRACT

There is described an image forming apparatus that serves as a client in the client/server type information processing system. The apparatus includes a communicating section to communicate with the server; a device information acquiring section to acquire device information for specifying the device; an information storing section to store server information for specifying the server and client information for specifying the client itself; and a control section to transmit the device information, acquired by the device information acquiring section, and the client information, stored in the information storing section, to the server specified by the server information through the communicating section, in order to request the server to send an application program corresponding to the device information back to the client. When the control section receives the application program from the server, the control section develops the application program into the storage so as to make the device available.

24 Claims, 17 Drawing Sheets

FIG. 6

| KIND OF DEVICE | FNS (0x1 **) | PRINTER (0x2 **) | SCANNER (0x3 **) | ... |
|---|---|---|---|---|
| FUNCTION | NORMAL (0x00) | MONOCHROME (0x00) | PLATEN (0x00) | |
| | PUNCH (0x01) | COLOR (0x01) | DF (0x01) | |
| | STAPLE (0x02) | | | |
| | | | | |

FIG. 7

| KIND OF DEVICE | FUNCTION | APPLICATION PROGRAM |
|---|---|---|
| FNS | NORMAL | prg0100 |
| | PUNCH | prg0101 |
| | STAPLE | prg0102 |
| PRINTER | MONOCHROME | prg0200 |
| | COLOR | prg0201 |
| SCANNER | PLATEN | prg0300 |
| | DF | prg0301 |
| ⋮ | ⋮ | ⋮ |

FIG. 12

| KIND OF DEVICE | FUNCTION | APPLICATION PROGRAM | VERSION |
|---|---|---|---|
| FNS | NORMAL | prg0100 | ver 1.0, ver 2.0, ver 3.0 |
| | PUNCH | prg0101 | ver 1.0 |
| | STAPLE | prg0102 | ver 1.0, ver 2.0 |
| PRINTER | MONOCHROME | prg0200 | ver 1.0, ver 2.0 |
| | COLOR | prg0201 | ver 1.0, ver 2.0, ver 3.0 ver 4.0, ver 5.0 |
| SCANNER | PLATEN | prg0300 | ver 1.0, ver 2.0 |
| | DF | prg0301 | ver 1.0, ver 2.0, ver 3.0 |
| ⋮ | ⋮ | ⋮ | ⋮ |

FIG. 13

| KIND OF DEVICE | FUNCTION | APPLICATION PROGRAM | VERSION |
|---|---|---|---|
| FNS | NORMAL | prg0100 | ver 1.0, ver 2.0, ver 3.0 |
| | PUNCH | prg0101 | ver 1.0 |
| | STAPLE | prg0102 | ver 1.0, ver 2.0 |
| PRINTER | MONOCHROME | prg0200 | ver 1.0, (ver 2.0) |
| | COLOR | prg0201 | ver 1.0, ver 2.0, (ver 3.0) ver 4.0, ver 5.0 |
| SCANNER | PLATEN | prg0300 | (ver 1.0)(ver 2.0) |
| | DF | prg0301 | ver 1.0, ver 2.0, ver 3.0 |
| ⋮ | ⋮ | ⋮ | ⋮ |

FIG. 15 (a) USER A

| KIND OF DEVICE | FUNCTION | APPLICATION PROGRAM | VERSION |
|---|---|---|---|
| FNS | NORMAL | prg0100 | ver 1.0, ver 2.0, ver 3.0 |
| | PUNCH | prg0101 | ver 1.0 |
| | STAPLE | prg0102 | ver 1.0, ver 2.0 |
| PRINTER | MONOCHROME | prg0200 | ver 1.0, ver 2.0 |
| | COLOR | prg0201 | ver 1.0, ver 2.0, ver 3.0, ver 4.0, ver 5.0 |
| SCANNER | PLATEN | prg0300 | ver 1.0, ver 2.0 |
| | DF | prg0301 | ver 1.0, ver 2.0, ver 3.0 |
| ⋮ | ⋮ | ⋮ | ⋮ |

FIG. 15 (b) USER B

| KIND OF DEVICE | FUNCTION | APPLICATION PROGRAM | VERSION |
|---|---|---|---|
| FNS | NORMAL | prg0100 | ver 3.0 |
| | PUNCH | prg0101 | ver 1.0 |
| | STAPLE | prg0102 | ver 2.0 |
| PRINTER | MONOCHROME | prg0200 | ver 1.0, ver 2.0 |
| | COLOR | prg0201 | ver 1.0, ver 2.0, ver 3.0, ver 4.0, ver 5.0 |
| SCANNER | PLATEN | prg0300 | ver 2.0 |
| | DF | prg0301 | ver 3.0 |
| ⋮ | ⋮ | ⋮ | ⋮ |

IMAGE FORMING APPARATUS CLIENT/SERVER TYPE INFORMATION PROCESSING SYSTEM AND INFORMATION PROCESSING METHOD

This application is based on Japanese Patent Application No. 2006-249015 filed on Aug. 14, 2006 with Japan Patent Office, the entire content of which is hereby incorporated by reference.

BACKGROUND OF THE INVENTION

The present invention relates to an image forming apparatus, a client/server type information processing system and an information processing method to be employed in the same system, in which the image forming apparatus serves as a client.

Conventionally, in a client/server type information processing system of general purpose, when an important job should be implemented in the client, the server conducts an authenticating operation for the client so as to implement the concerned job in the client authenticated by the server. For instance, in the system in which an image forming apparatus, such as a copier, etc., serves as the client, various kinds of application programs are installed into the client in advance, so that, when the server transmits print data to the client authenticated by the server, the concerned client employs the necessary application program stored in advance to implement the print operation for forming an image based on the job data transmitted from the server.

For instance, Patent Document 1 (Tokkai 2004-58499, Japanese Non-Examined Patent Publication) sets forth the system in which, with respect to the downloading operation of additional application programs, the server grasps information of application programs currently installed in the client, so that the server can transmit an additional application program, which is currently lacked in the client and is to be installed in the client, so as to make a specific function concerned to the additional application program available in the client.

In the conventional client/server type information processing system mentioned in the above, however, since the various kinds of application programs to be employed for processing the job data are installed in advance into the client, and further, various kinds of important data generated in mid-course of the job operation are stored in various storages, such as an HDD (Hard Disc Drive), etc., of the client, there has been such a risk that the important data are also stolen when the client apparatus is stolen, and specifically, there has been such a problem that it is difficult to prevent the leakage of the information when a plurality of client apparatuses are coupled to the system.

Further, in the conventional system mentioned in the above, since it is necessary for the client to install the application programs corresponding to all of the devices, which are possibly configured into the client, there has been such another problem that the apparatus cost of the client increases.

Still further, in the conventional system mentioned in the above, since maintenance processing for correcting defects or updating versions of the various kinds of application programs should be individually conducted with respect to each of the clients, every time when such the defect or the version change occurs, there has been still another problem that it is impossible to easily cope with such the defect or the version change, and accordingly, it is impossible to set each of the clients at an appropriate state.

Yet further, in the conventional system mentioned in the above, since it is also impossible to update the version of each application program for every user using the specific client, there has been still another problem that it is impossible to provide a user-friendly system.

SUMMARY OF THE INVENTION

To overcome the abovementioned drawbacks in conventional image-recording apparatus, it is one of objects of the present invention to provide an image forming apparatus, a client/server type information processing system and an information processing method of the same, each of which makes it possible to prevent a leakage of information when the client is stolen.

Further, it is another one of objects of the present invention to provide an image forming apparatus, a client/server type information processing system and an information processing method of the same, each of which makes it possible to achieve a cost reduction of the system, specifically, a cost reduction of a client.

Still further, it is still another one of objects of the present invention to provide an image forming apparatus, a client/server type information processing system and an information processing method of the same, each of which makes it possible to easily cope with a version update operation and/or a debugging operation of the application program.

Yet further, it is yet another one of objects of the present invention to provide an image forming apparatus, a client/server type information processing system and an information processing method of the same, each of which makes it possible to improve a convenience of the user.

Accordingly, at least one of the objects of the present invention can be attained by the image forming apparatus, the client/server type information processing system and the information processing method described as follows.

(1) According to an image forming apparatus reflecting an aspect of the present invention, the image forming apparatus that serves as a client coupled to a server through a communication network and includes at least a device for processing data, wherein none of application programs for activating the device are installed in advance, comprises: a communicating section to communicate with the server; a device information acquiring section to acquire device information for specifying the device; an information storing section to store server information for specifying the server and client information for specifying the client itself; and a control section to transmit the device information, acquired by the device information acquiring section, and the client information, stored in the information storing section, to the server specified by the server information through the communicating section, in order to request the server to send an application program corresponding to the device information back to the client; wherein, when the control section receives the application program from the server, the control section develops the application program into a storage so as to make the device available.

(2) According to a client/server type information processing system reflecting another aspect of the present invention, the client/server type information processing system comprises: a communication network through which various kinds of information are communicated; an image forming apparatus serving as a client and coupled to the communication network; and a server coupled to the communication network so as to bilaterally communicate with the image forming apparatus through the communication network; wherein the image forming apparatus, serving as the client, includes: a device to process data, wherein none of application programs for activating the device are installed in advance; a client-attributed communicating section to communicate with the server; a device information acquiring section to acquire device information for specifying the device; an information storing section to store server information for specifying the server and client information for specifying the client itself; and a client-attributed control section to transmit the device information, acquired by the device information acquiring section, and the client information, stored in the information storing section, to the server specified by the server information through the client-attributed communicating section; and wherein the server includes: a server-attributed communicating section to communicate with the client; an application program storage section to store a plurality of various application programs including an application program corresponding to the device information; an authenticating section to authenticate the client or a user who uses the client; and a server-attributed control section to specify the application program corresponding to the device information from the plurality of various application programs stored in the application program storage section, in order to transmit the application program corresponding to the device information to the client through the server-attributed communicating section; and wherein, when the client-attributed control section receives the application program from the server, the client-attributed control section develops the application program into a storage so as to make the device available.

(3) According to an information processing method reflecting still another aspect of the present invention, the information processing method to be employed in a client/server type information processing system that includes a communication network through which various kinds of information are communicated, an image forming apparatus serving as a client and coupled to the communication network, and a server coupled to the communication network so as to bilaterally communicate with the image forming apparatus through the communication network, the method comprises: acquiring device information for specifying a device configured into the client, to store the device information in the client; transmitting the device information, acquired by the client, and client information for specifying the client to the server from the client; authenticating the client based on the client information received form the client in the server; specifying an application program corresponding to the device information from a plurality of various application programs stored in advance in the server, so as to transmit the application program to the client; and developing the application program into a storage of the client, so as to make the application program available for the client.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows an example of device information, embodied in the present invention as the first embodiment;

FIG. 7 shows a table in which device information stored in a server are correlated with various kinds of application programs, embodied in the present invention as the first embodiment;

FIG. 12 shows a table in which device information are correlated with various kinds of application programs to be stored in a server, embodied in the present invention as the second embodiment;

FIG. 13 show a table in which device information are correlated with various kinds of application programs, to be stored in a server embodied in the present invention as the second embodiment;

FIG. 15(a) and FIG. 15(b) show tables in which device information are correlated with various kinds of application programs, to be stored in a server embodied in the present invention as the third embodiment;

DETAILED DESCRIPTION OF THE PREFERRED EMBODIMENT

As described in the "BACKGROUND OF THE INVENTION", in the client/server type information processing system 10 in which the image forming apparatus serves as the client, since the system is so constituted that various kinds of application programs are installed in advance into the client, and, when the server transmits job data to the client authenticated by the server, the concerned client processes the job data transmitted from the server, the aforementioned problems has occurred, when the client apparatus is stolen.

In this connection, generally speaking, the apparatus serving as the server cannot be easily taken out due to its heavy weight and its large-sized dimension like a copier, and is installed in a high-security room, such as a server room or the like. Accordingly, considering such the abovementioned properties unique to the server, the system in the present invention is so constituted that the server correctively stores all of the application programs in it, so that each of the clients coupled to the system can download the necessary application programs from the server every time when the power switch of the client turns ON, while the downloaded application programs are deleted from the client when the power switch of the client turns OFF. Further, the system is so constituted that the server correctively stores all of the data, generated or received by each of the clients, in it, while the data are deleted from the client without storing them in the client.

According to the system configuration mentioned in the above, it becomes possible not only to prevent the leakage of the information even when the client apparatus is stolen, but also to achieve the cost-reduction of the system. Further, even when a defect or a version update of a specific application program occurs, it becomes possible to easily cope with such the defect or the version update, and accordingly, it also becomes possible to set each of the clients at an appropriate state. Still further, by making it possible to set the version of each application program for every user, a convenience-ability of the user will be improved.

Embodiment 1

Figure 1:
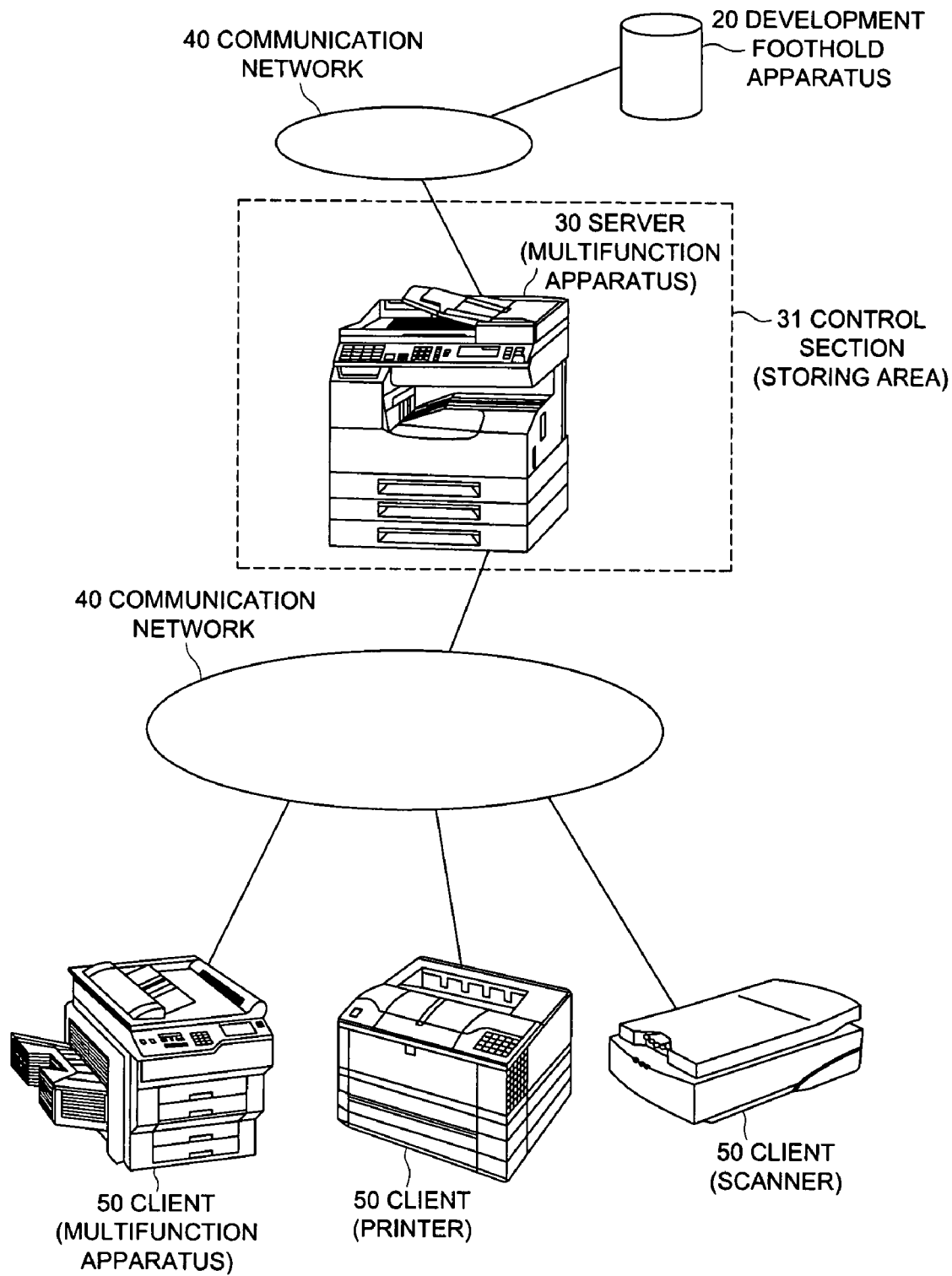
FIG. 1 shows a schematic diagram indicating a configuration of a client/server type information processing system embodied in the present invention as the first embodiment.
Figure 2:
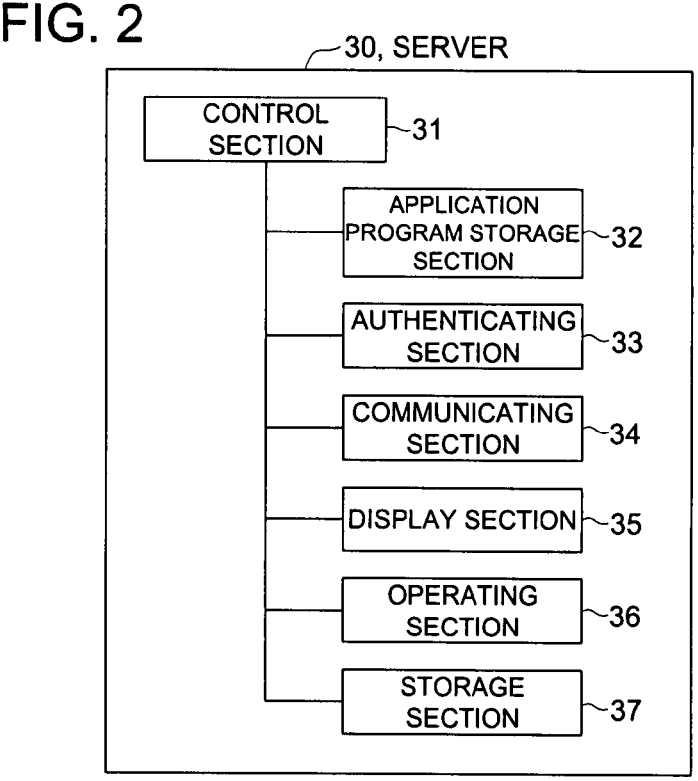
FIG. 2 shows a block diagram indicating a configuration of a server embodied in the present invention as the first embodiment.
Figure 3:
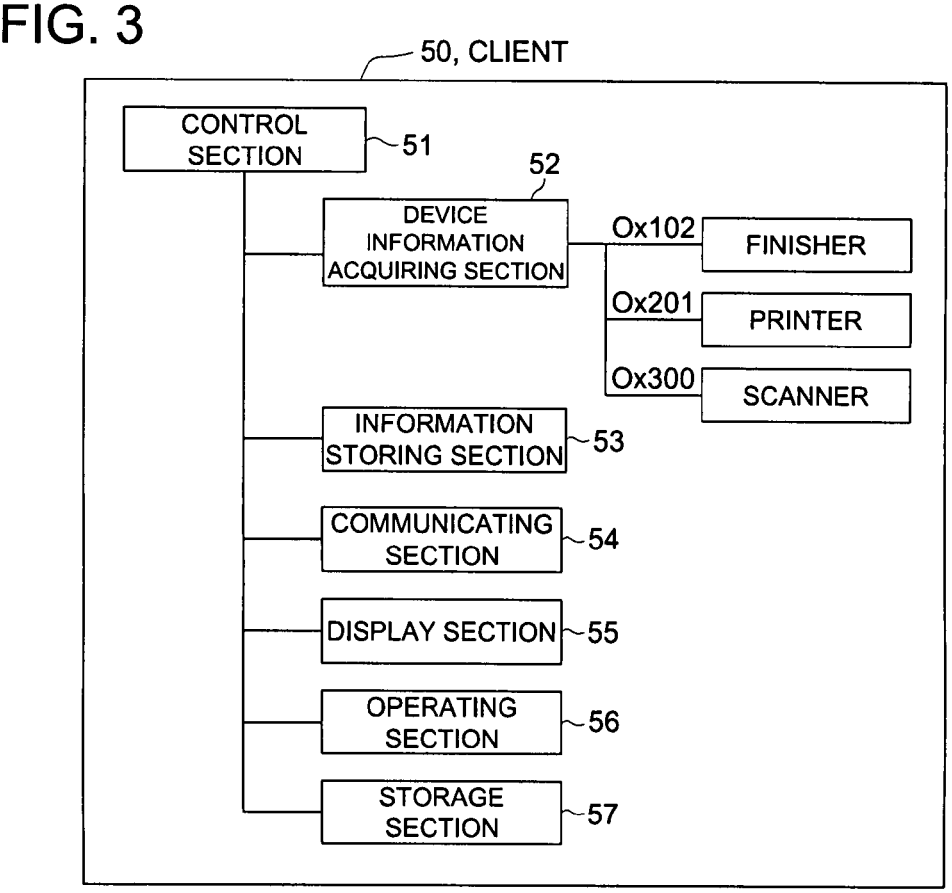
FIG. 3 shows a block diagram indicating a configuration of a client embodied in the present invention as the first embodiment.
Figure 4:
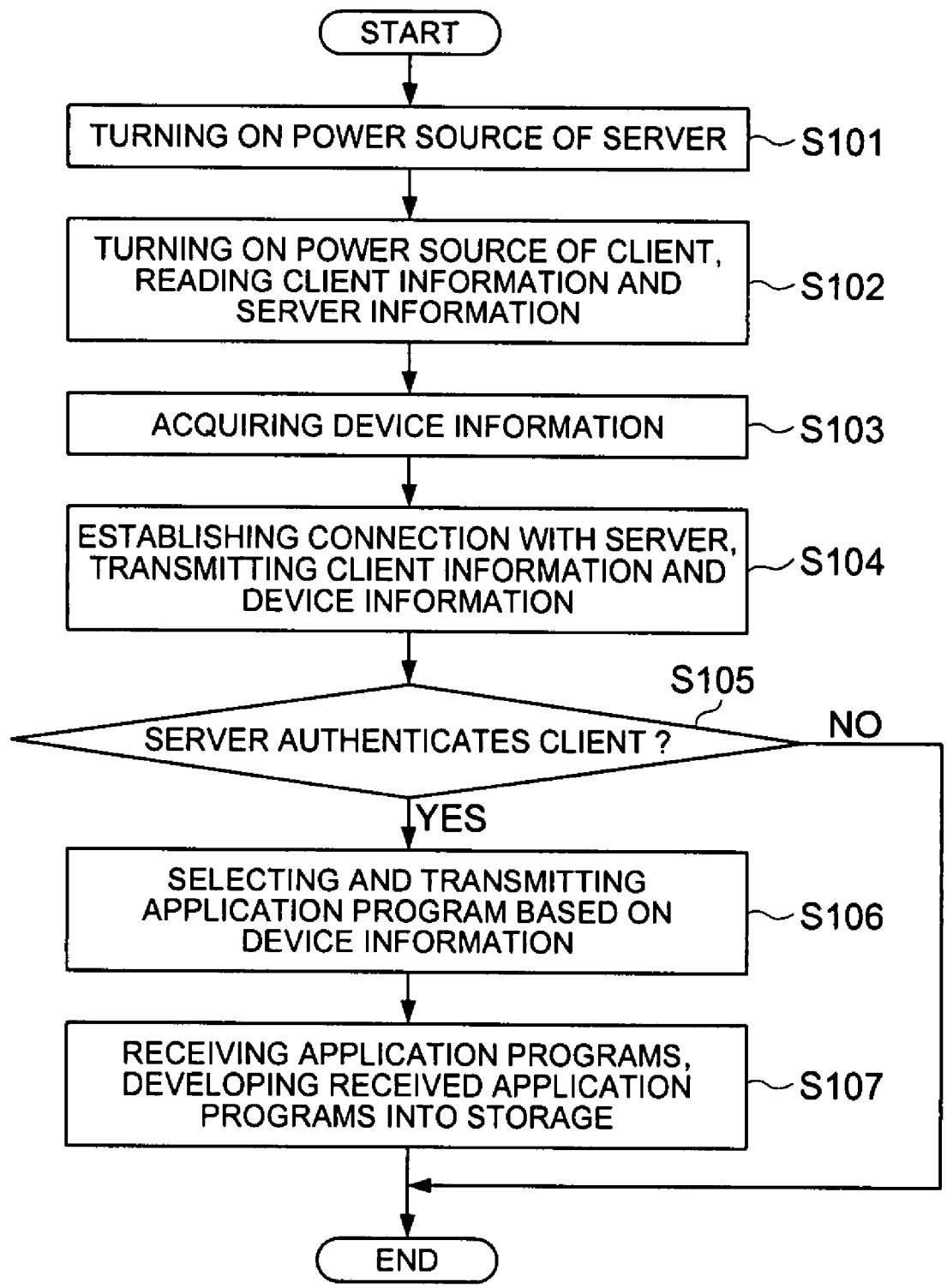
FIG. 4 shows a flowchart indicating a procedure for downloading an application program into the client, to be conducted in a client/server type information processing system embodied in the present invention as the first embodiment.
Figure 5:
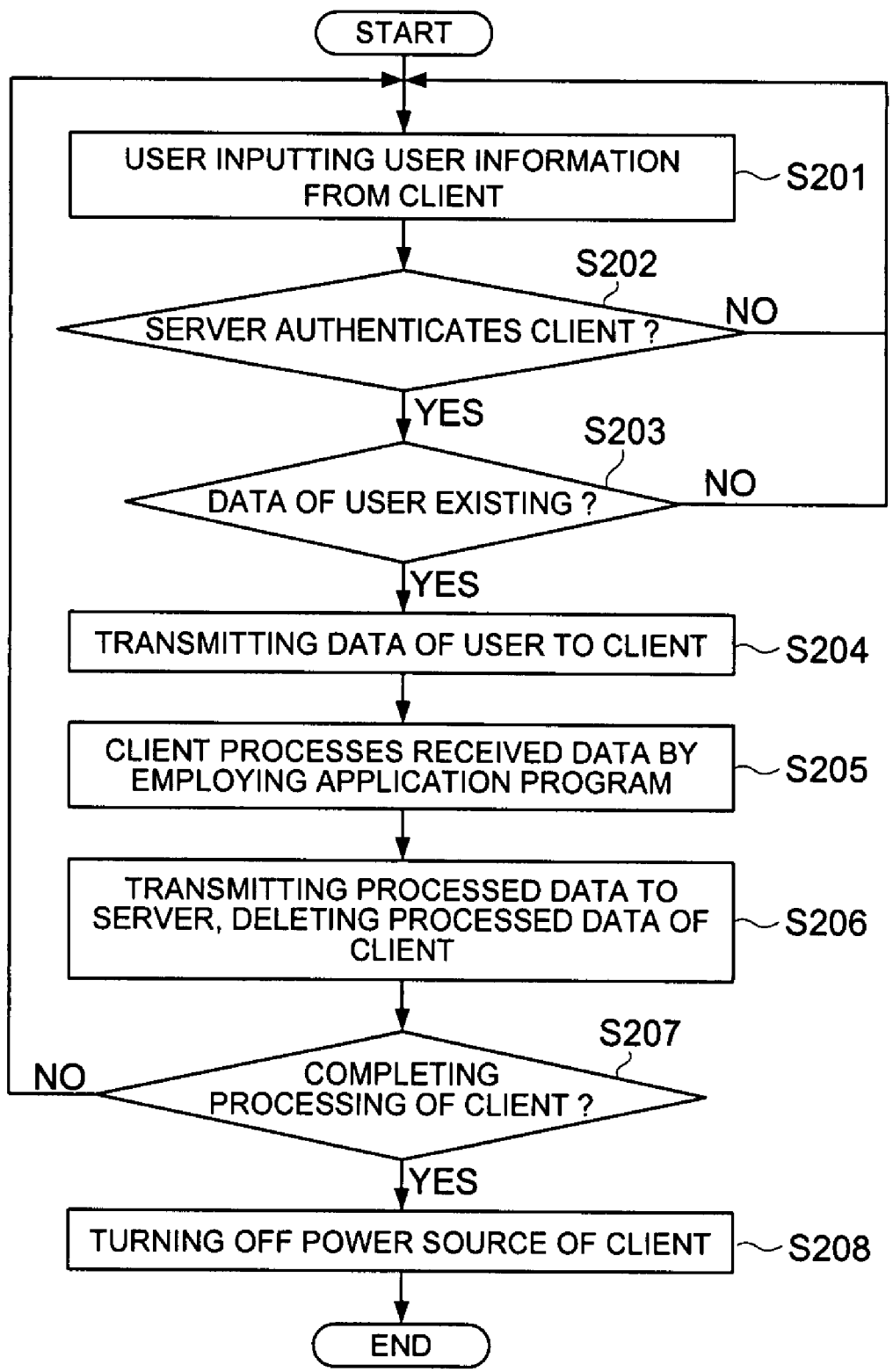
FIG. 5 shows a flowchart indicating a procedure for processing data, to be conducted in a client/server type information processing system embodied in the present invention as the first embodiment.

Initially, referring to FIG. 1 through FIG. 7, an image forming apparatus, a client/server type information processing system and an information processing method to be employed in the same, embodied in the present invention, will be detailed in the following as the first embodiment. FIG. 1 shows a schematic diagram indicating a configuration of the client/server type information processing system embodied in the present invention. Further, FIG. 2 shows a block diagram indicating a configuration of the server, while FIG. 3 shows a block diagram indicating a configuration of the client. Still further, FIG. 4 shows a flowchart indicating a procedure for downloading an application program into the client, while FIG. 5 shows a flowchart indicating a procedure for processing data by employing the client into which the application program is downloaded. Yet further, FIG. 6 shows an example of device information, while FIG. 7 shows a table in which the device information stored in the server are correlated with the various kinds of application programs.

As shown in FIG. 1, in a client/server type information processing system 10, a single or a plurality of image forming apparatus, serving as a client 50, a server 30 for controlling the single or the plurality of image forming apparatus and a development foothold apparatus 20 which is installed in the foothold area for developing the application programs to be downloaded into the client 50 are coupled to each other through a communication network 40, such as a LAN (Local Area Network), a WAN (Wide Area Network), etc.

The abovementioned term of "image forming apparatus" serving as the client 50 is a general name of the apparatus that is provided with a function for forming an image for a print or a display purpose, and for instance, represents a multi-functioned apparatus, which is provided with a printer function, a FNS (finisher) function and a scanner function, a printer, a scanner, etc. Further, the image forming apparatus embodied in the present invention is only provided with hardware to achieve the function for forming an image, and no application programs for controlling the hardware are installed in advance into the image forming apparatus. Still further, although any kind of configuration is applicable as that of the server 30, as far as the server 30 has a function for providing the application programs and the data to the client 50, the server 30 could be an image forming apparatus that is provided with at least one of a printer function, a FNS (finisher) function and a scanner function.

Now, if the multi-functioned apparatus were employed as the server 30, it would be quite difficult to easily take out the multi-functioned apparatus serving as the server 30 due to its heavy weight and its large-sized scale. Further, generally speaking, since the apparatus serving as the server 30 is installed in an installation area 31, such as a server room, etc., where the security is maintained at a high level, it can be said that the server 30 itself is hardly stolen. Accordingly, if the server 30 stores the application programs for editing the document and the images in it, and stores the data, created as a result of editing the document and the images, in the strongly-protected storages, such as the HDD (Hard Disc Drive), etc., of the server 30, the theft prevention and the management of the data will become easy. Based on the above considerations, the server 30 and the client 50 of the present embodiment are configured as shown in FIG. 2 and FIG. 3, respectively.

Concretely speaking, as shown in FIG. 2, the apparatus serving as the server 30 is provided with an application program storage section 32 to store the application programs to be provided to the client 50, an authenticating section 33 to authenticate the client 50 and the user, a communicating section 34 to communicate with the client 50 and the development foothold apparatus 20, a display section 35 to display various kinds of information, an operating section 36 to input various kinds of information, a storage section 37 to store the data and setting information in it, a control section 31 to control each of the abovementioned sections, etc.

Further, as shown in FIG. 3, the apparatus serving as the client 50 is provided with a device information acquiring section 52 to acquire information with respect to devices (such as a printer, a finisher, a scanner, etc.) to be configured into the client 50 (hereinafter, referred to as device information), an information storing section 53 to store information, including a client IP address, a product serial number, etc., for specifying the client (hereinafter, referred to as client information) and information, including a server IP address, etc., for specifying a connecting destination of the server 30 (hereinafter, referred to as server information), etc., a communicating section 54 to communicate with the server 30, a display section 55 to display various kinds of information, an operating section 56 to input various kinds of information, a storage section 57 to temporarily store the application programs and the data, and to store setting information, etc., in it, a control section 51 to control each of the abovementioned sections, etc.

Next, referring to the flowchart shown in FIG. 4, the procedure for downloading the application program into the client 50 by employing the server 30 and the client 50 included in the abovementioned configuration.

At first, when the power source of the server 30 is turned ON in Step S101, the server 30 enters into an available state.

Successively, when the power source of the client 50 is turned ON in Step S102, the control section 51 of the client 50 reads the client information and the server information stored in advance in the information storing section 53.

Successively, the control section 51 employs the device information acquiring section 52 in Step S103 to acquire the information (device information) with respect to the devices configured into the client 50. In this connection, in the present embodiment as shown in FIG. 6, three kinds of devices including a printer, a finisher and a scanner are currently available, and, as the functions of the devices, the monochrome printing function and the color printing function can be provided for the printer, the normal function, the punching function, the stapling function (including functions, such as a normal binding, one point binding, two point binding, a corner binding, etc.) can be provided for the finisher, and the platen function and the DF (Document Feeder) function can be provided for the scanner. Further, each type of the devices and its function are specified by the values allotted in advance to each of the devices and each of the functions. For instance, the finisher provided with the stapling function, the printer provided with the color printing function and the scanner provided with the platen function are configured into the client 50 shown in FIG. 3, and accordingly, the control section 51 acquires the values of 0x102, 0x201 and 0x300, as the device information of these devices.

Next, the control section 51 of the client 50 employs the communicating section 54 in Step S104 to establish the connection with the server 30 specified by the server information, in order to transmits the client information acquired in Step S102 and the device information acquired in Step S103 to the server 30.

Then, the control section 31 of the server 30 employs the communicating section 34 to transmit the received client information to the authenticating section 33, so that the authenticating section 33 authenticates the client 50 based on the client information concerned, in Step S105. Concretely speaking, since the client information of the client 50 is registered in advance at the storage section 37 of the server 30, the authenticating section 33 authenticates the client 50 as the authorized client when the client information received from the client 50 coincides with that registered at the storage section 37.

Further, when the authenticating section 33 does not authenticate the client 50, the server 30 halts the processing. At this time, it is applicable that the server 30 notifies the client 50 of the rejection of the authentication before halting the processing. In addition, it is applicable that the client 50 halts the processing, when the client 50 receives either the rejection of the authentication, or no response from the server 30 within a predetermined time period.

On the other hand, when the authenticating section 33 authenticates the client 50 as the authorized client, the control section 31 of the server 30 notifies the application program storage section 32 of the device information. As shown in FIG. 7, since the kinds of devices and the application programs are stored in the application program storage section 32 for every function, the control section 31 reads out a single or a plurality of specific application program(s) corresponding to the device(s) of the client 50 from the application program storage section 32 in Step S106, based on the device information concerned, so as to transmit the readout application program(s) to the client 50 by employing the communicating section 34. For instance, in the case of the client 50 having the configuration shown in FIG. 3, the control section 31 of the server 30 reads out application program prg0102 for the finisher provided with the stapling function, application program prg0201 for the printer provided with the color printing function and application program prg0300 for the printer provided with the platen function, so as to send them to the client 50.

Successively, in Step S107, the control section 51 of the client 50 employs the communicating section 54 to receive the application programs, and then, develops the received application programs into the RAM (Random Access Memory), etc., so as to initialize the devices and to make them currently available.

As described in the foregoing, since the system embodied in the present invention is so constituted that the application program(s) is/are downloaded from the server 30 to the client 50, it is unnecessary to install the application programs in advance into the client 50 proper. Further, since the server 30 downloads only the application programs necessary for the devices configured into the client 50, it becomes possible to exclude unnecessary application programs from the application programs to be downloaded, resulting in a possibility of providing a low-cost client, and accordingly, resulting in a cost-reduction of the whole system.

Next, referring to the flowchart shown in FIG. 5, the procedure for processing data by employing the client 50 into which the application programs are currently downloaded will be detailed in the following. In this connection, it is assumed in the following explanation that the server 30 stores in advance the data sent from the user in it.

At first, when the user inputs information specifying the user (hereinafter, referred to as user information), such as a user ID, a password, etc., from the operating section 56 of the predetermined client 50 in Step S201, the control section 51 of the client 50 transmits the inputted user information to the server 30.

Successively, the server 30 authenticates the user based on the user information received from the client 50 in Step S202. Concretely speaking, since the user information of the user authorized for using the system is stored in advance at the storage section 37 of the server 30, the authenticating section 33 authenticates the user as the authorized user when the user information received from the client 50 coincides with that stored at the storage section 37.

Then, when the user cannot be authenticated, the flow returns to Step S201, while, when the user cannot be authenticated, the control section 31 of the server 30 determines whether or not the data registered in advance with respect to the user concerned exist in the storage section 37 in Step S203. When the data does not exist, the flow returns to Step S201, while, when the data exist, the control section 31 employs the communicating section 34 to transmit the data to the client 50 in Step S204.

Successively, the control section 51 of the client 50 processes the received data by employing the application program(s) downloaded in advance, to output the processed material based on the data in Step S205. For instance, when the received data represents the printing data, the received data are sent to the printer, so that the printer can print an image onto the paper material, etc., to output the printed material.

Still successively, in Step S206, the control section 51 of the client 50 employs the communicating section 54 to transmit the processed data to the server 30, so that the server 30 stores the received data into the storage section 37, such as the HDD, etc., while correlating them with the user information. In this connection, the processed data have been stored in a certain storage section of the client in the conventional system at the above occasion, while, in the present embodiment, the processed data are deleted from the client 50, so as to prevent the leakage of the data when the client apparatus is stolen. Further, the data stored in the storage section 37 of the server 30 are read out and outputted by employing the user information.

Still successively, when the processing of the client 50 is completed in Step S207, the power source of the client 50 is turned OFF in Step S208. In this connection, since the application programs have been installed and stored in a certain nonvolatile storage device of the client in the conventional system, the application programs have not been deleted from the client even when the power source is turned OFF, while, in the present embodiment, the application programs are deleted from the client 50 at the same time when its power source is turned OFF, so that the concerned data cannot be processed by employing the application programs when the client apparatus is stolen.

As described in the foregoing, since the application program(s) is/are downloaded from the server 30 to the client 50 every time when the power source of the client 50 is turned ON, and activated by developing them into the storage device, and then, deleted from the client 50 every time when the power source of the client 50 is turned OFF, and in addition, since the data are collectively stored in the server 30, and then, deleted from the client 50 after the processing is completed, it becomes possible to securely prevent the leakage of the data even when the apparatus of the client 50 is stolen.

In this connection, although the system is so constituted that both the application programs and the data are deleted from the client 50 in the embodiment mentioned in the above, since it is difficult to process the data currently stored in the client 50 if the application programs are deleted from the client 50, the effect same as the above can be achieved even in the system, which is so constituted that the processed data are still stored in the storage section 57 without deleting them. Further, although the application programs for all of the devices are immediately downloaded when the power source of the client 50 is turned ON in the embodiment mentioned in the above, for instance, it is also applicable that the application programs are downloaded stepwise in such a manner that one of them corresponding to a specific device is downloaded at the time when the usage of the specific device is required. Further, it is possible to obtain the abovementioned effect even in the system configuration in which only the application program(s) corresponding to a part of the device(s) are downloaded, for instance, the system in which the application program, corresponding to the device that does not directly contribute the processing operation of the data (for instance, the finisher) is installed in advance into the client 50, while the other application program(s), corresponding to the device(s) that directly contribute(s) the processing operation of the data (for instance, the printer and scanner) is/are installed into the client 50 every time when the power source of the client 50 is turned ON, etc. Still further, in the case that an external storage device (for instance, an HDD, a DVD, etc.) is coupled to the client 50, it is applicable that the application programs are downloaded and developed in the storage section when the connection of the external storage device is detected, and then, the downloaded application programs are deleted from the storage section when the disconnection of the external storage device is detected.

Embodiment 2

Figure 8:
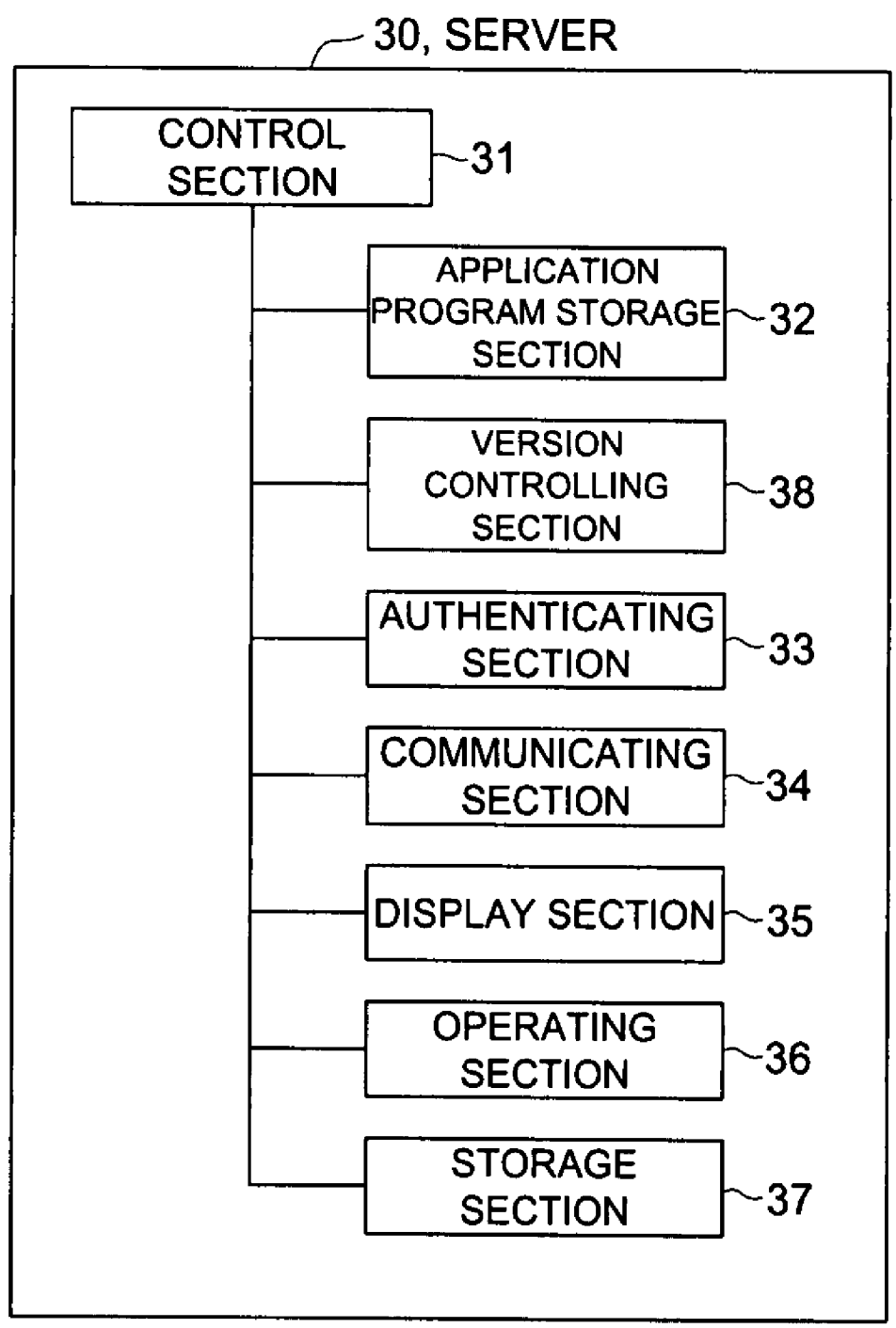
FIG. 8 shows a block diagram indicating a configuration of a server, embodied in the present invention as the second embodiment.
Figure 9:
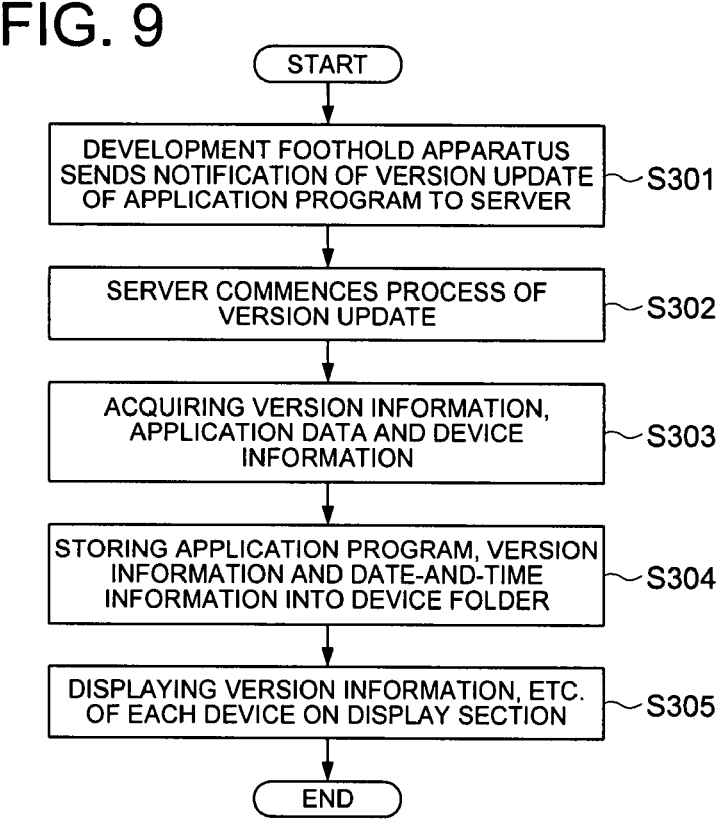
FIG. 9 shows a flowchart indicating a procedure for updating versions of application programs to be stored in a server, embodied in the present invention as the second embodiment.
Figure 10:
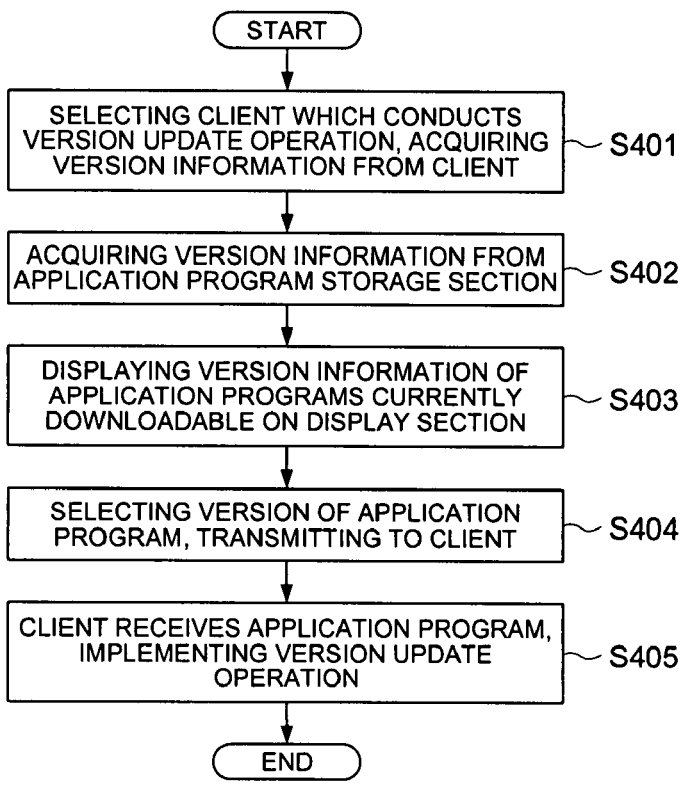
FIG. 10 shows a flowchart indicating procedures for updating versions of application programs downloaded into a client, embodied in the present invention as the second embodiment.
Figure 11:
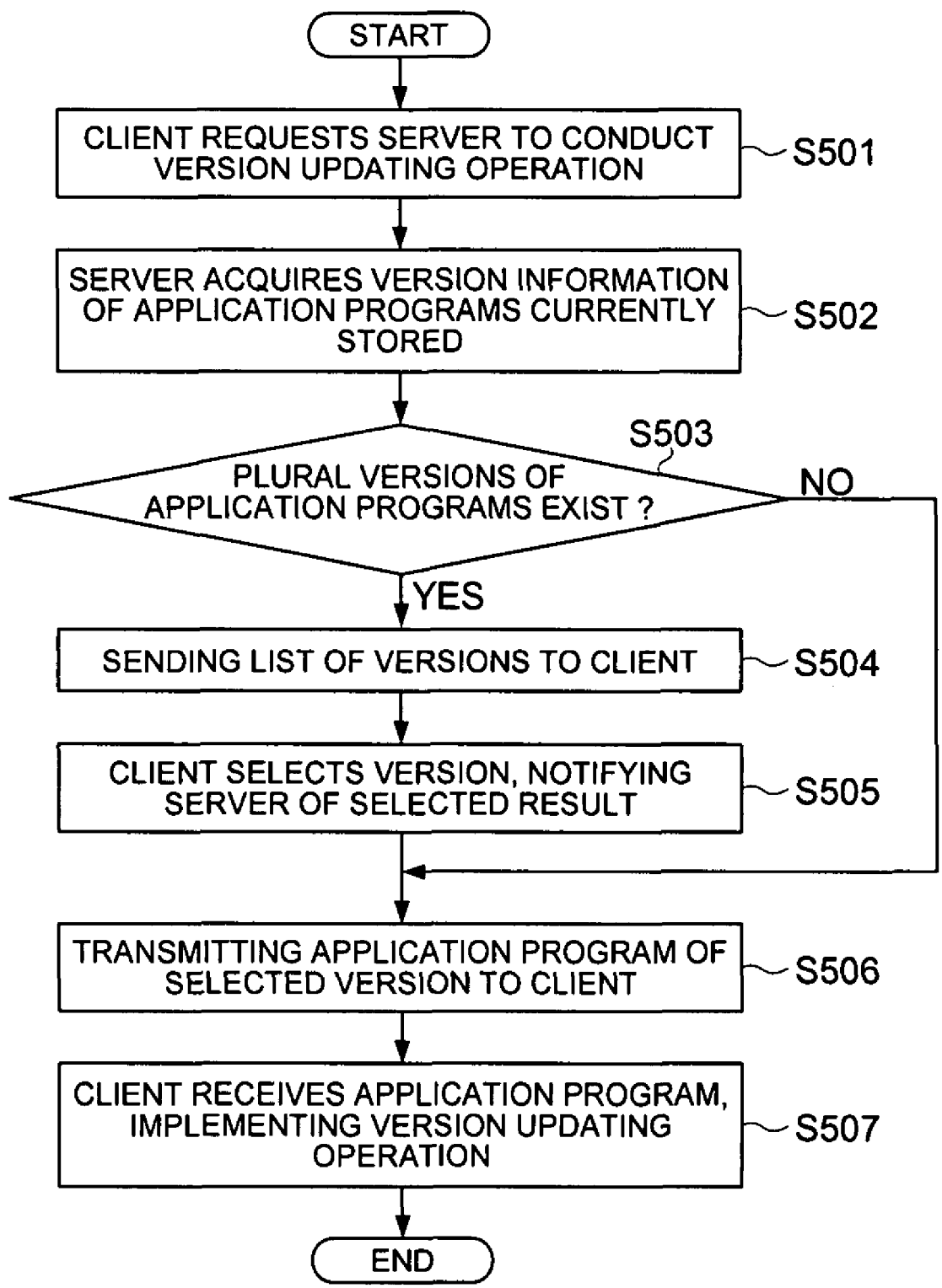
FIG. 11 shows a flowchart indicating procedures for updating versions of application programs downloaded into a client, embodied in the present invention as the second embodiment.

Next, referring to FIG. 8 through FIG. 13, an image forming apparatus, a client/server type information processing system and an information processing method to be employed in the same, embodied in the present invention, will be detailed in the following as the second embodiment. FIG. 8 shows a block diagram indicating a configuration of the server of the second embodiment. Further, FIG. 9 shows a flowchart indicating a procedure for updating versions of the application programs stored in the server, while FIG. 10 and FIG. 11 show flowcharts indicating procedures for updating versions of the application programs stored in the client. Still further, FIG. 12 and FIG. 13 show tables in which the device information are correlated with the various kinds of application programs.

Since the application programs for activating the devices configured into the image forming apparatus serving as the client 50 are intermittently improved as needed, the procedure for updating the versions of the abovementioned application programs will be detailed in the second embodiment. In the second embodiment, although the configuration of the client 50 is the same as that of the first embodiment, version information of the application programs downloaded with respect to each of the devices and version information of the other available application programs are stored in the information storing section 53. Further, in addition to the configuration of the first embodiment, a version controlling section 38 for controlling the versions of the application programs is added to the server 30 as shown in FIG. 8.

Referring to the flowchart shown in FIG. 9, the procedure for updating the versions of the application programs stored in the server 30 having the abovementioned configuration will be detailed in the following.

Initially, when the development foothold updates the version of the application program, the development foothold apparatus 20 sends a notification of version update to the server 30 in Step S301.

Successively, when the control section 31 of the server 30 receives the notification of version update by employing the communicating section 34 in Step S302, the process of the version update is commenced. Then, in Step S303, the version controlling section 38 acquires the version information of the application program (for instance, a version member, an updating history, etc.), application data of the new version and the device information of the device corresponding to the application program concerned, from the development foothold apparatus 20.

Still successively, in Step S304, the version controlling section 38 stores the application data of the predetermined version into the application program storage section 32, while correlating each of them with the corresponding kind of the device and its function. Concretely speaking, a predetermined folder (for instance, a printer utility holder) is provided in the application program storage section 32 for every kind of devices and functions, so as to store the application data into the folder of the device corresponding to the application program to be updated. At this occasion, the version information of the application program and the date-and-time information of the version update are also stored, while correlating them with the application data.

Then, after all of the application data are stored, in Step S305, the control section 31 controls the display section 35 so as to display the kind of application program, the version information, the date-and-time information of the version update, etc., while correlating them with the kind of the device and the function, on the display screen. Although the mode of this display layout could be arbitrarily determined, for instance, the table shown in FIG. 12 would be applicable for this purpose.

Next, referring to the flowchart shown in FIG. 10, the procedure for selecting a specific version from a plurality of versions of the application program, and downloading the application program into the client 50 will be detailed in the following.

At first, in Step S401, the manager of the server 30 operates the operating section 36 to select the client 50, which conducts the version update of the application program. Then, the version controlling section 38 of the server 30 employs the communicating section 34 to access the client 50 selected, in order to inquire of the information storing section 53, and then, acquires the version information of the application program currently available for each of the devices configured into the client 50 concerned.

Successively, in Step S402, the version controlling section 38 of the server 30 inquires the storing status of the application programs from the application program storage section 32, to acquire the version information of the application programs currently stored.

Still successively, in Step S403, the control section 31 of the server 30 controls the display section 35 so as to display a list of the versions of the application programs acquired from the application program storage section 32, in such a manner that the available versions of the application programs currently established in the information storing section 53 can be recognized. For instance, when the application programs currently stored in the information storing section 53 are the same as the list shown in FIG. 12, each of the application programs being available in the client 50 is marked by surrounding it with a circle as shown in FIG. 13, so as to display them in the recognizable mode.

Still successively, in Step S404, when the manager of the server 30 operates the operating section 36 to select a specific version of the application program, the control section 31 controls the communicating section 34 so as to download the application program of the specific version selected into the client 50, and then, controls the version controlling section 38 so as to store the version information and the date-and-time information of the downloading operation, with respect to the downloaded application program, while correlating them with the client 50.

Yet successively, in Step S405, the control section 51 of the client 50 employs the communicating section 54 to receive the application program downloaded, and then, implements the version update operation.

Although the flowchart shown in FIG. 10 is applicable for such the case that the manager of the server 30 selects the specific version of the application program to be downloaded into the client 50, it is also applicable that the user of the client 50 selects the specific version of the application program to be downloaded into the client 50. Referring to the flowchart shown in FIG. 11, the procedure for the above case will be detailed in the following.

At first, in Step S501, when the user of the client 50 operates the operating section 56 to instruct the version update, the control section 51 controls the communicating section 54 so as to request the server 30 to conduct the version updating operation.

Successively, in Step S502, the version controlling section 38 of the server 30 inquires the storing status of the application programs from the application program storage section 32, to acquire the version information of the application programs currently stored.

Still successively, when plural versions of the application programs exist in Step S503, the version controlling section 38 sends a list of the versions of the application programs, acquired from the application program storage section 32, to the client 50 in Step S504.

Still successively, in Step S505, the client 50 displays the received list of the versions on the display section 55 in a selectable mode, so that the user of the client 50 can select a desired version by using the operating section 56. Then, the client 50 notifies the server 30 of the selected result.

Still successively, in Step S506, receiving the notification from the client 50, the server 30 transmits the application program of the selected version to the client 50 (or, when a single version exists with respect to the application program concerned in Step S503, the server 30 transmits the application program of this single version to the client 50), and, at the same time, stores the version information and the date-and-time information of the downloading operation, with respect to the downloaded application program, into the version controlling section 38, while correlating them with the client 50. Then, the control section 51 of the client 50 employs the communicating section 54 to receive the downloaded application program, and implements the version updating operation in Step S507.

In this connection, although both the case in which the manager of the server 30 selects the application program to be downloaded into the client 50 and the other case in which the user of the client 50 selects the version of the application program to be downloaded into the client 50 of the user himself, are described in the foregoing, it is also applicable that the system is so constituted that the latest versions of the application programs are always and automatically downloaded into the client 50 instead of being selected by either the manager or the user, or it is also applicable that the versions of the application programs issued after a specific date-and-time are automatically downloaded into the client 50. In such the cases, it is applicable that the version controlling section 38 compares the version information stored in the application program storage section 32 with the version information acquired from the information storing section 53 of the client 50, or compares the date-and-time information of the version updating operation of the application program stored in the application program storage section 32 with the date-and-time information when the application program is downloaded into the client 50, so as to download the application program of the predetermined version based on the above-mentioned comparison result.

As described in the foregoing, since the system embodied in the present invention is so constituted that the application programs are downloaded from the server 30, by updating the application programs stored in the server 30 when the application programs are updated, it becomes possible to download the application program of the desired version for every client 50. Accordingly, it becomes possible not only to make the version updating operation easy, but also to set the client 50 at an appropriate condition.

Embodiment 3

Figure 14:
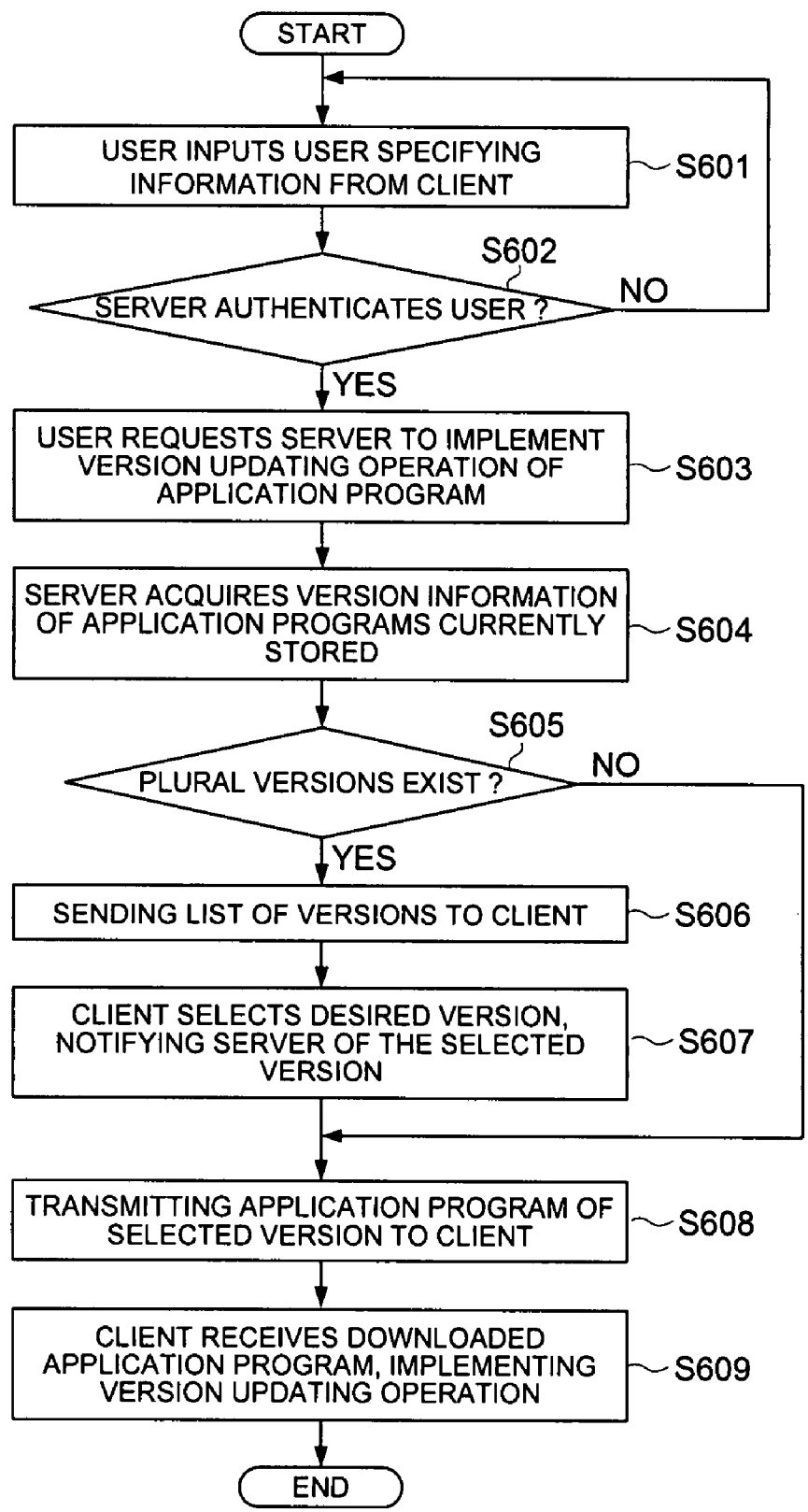
FIG. 14 shows a flowchart indicating a procedure for updating versions of application programs into a client, embodied in the present invention as the third embodiment.

Next, referring to FIG. 14 and FIG. 15, an image forming apparatus, a client/server type information processing system and an information processing method to be employed in the same, embodied in the present invention, will be detailed in the following as the third embodiment. FIG. 14 shows a flowchart indicating a procedure for updating versions of the application programs of the client, while FIG. 15(a) and FIG. 15(b) show tables in which the device information are correlated with the various kinds of application programs.

Although the versions of the application programs are established for every client 50 in the second embodiment, it is also possible to establish the versions of the application programs for every user who uses the client 50. Referring to the flowchart shown in FIG. 14, the procedure of this case will be detailed in the following.

At first, in Step S601, when the user inputs the user information, such as a user ID or a password, by using the operating section 56 of the client 50, the control section 51 of the client 50 employs the communicating section 54 to transmit the user information inputted by the user to the server 30.

Successively, in Step S602, the authenticating section 33 of the server 30 compares the received user information with those registered in advance into the storage section 37, in order to authenticate the user concerned.

Still successively, when the user is not authenticated, the flow returns to Step S601, while, when the user is successfully authenticated, the user instruct the version updating operation by operating the operating section 56 of the client 50 in Step S603, and the control section 51 employs the communicating section 54 to request the server 30 to implement the version updating operation of the application program concerned.

Still successively, in Step S604, the version controlling section 38 of the server 30 inquires the storing status of the application programs from the application program storage section 32, to acquire the version information of the application programs currently stored. The folders are created in advance for every user in the application program storage section 32, so as to store the application program data of the downloadable version in each of the folders.

Still successively, when plural versions of the application programs exist in Step S605, the version controlling section 38 sends a list of the versions of the application programs, acquired from the application program storage section 32, to the client 50 in Step S606. For instance, this list of the versions is configured as shown in FIG. 15(a) and FIG. 15(b), in which the kinds of devices and functions, the application programs and the available version information are described, while correlating them each other.

Still successively, the control section 51 of the client 50 employs the display section 55 to display the received list of the versions in a selectable mode. Then, when the user of the client 50 selects a desired version from them, the control section 51 employs the communicating section 54 to notify the server 30 of the selected result in Step S607.

Still successively, receiving the notification from the client 50 in Step S608, the control section 51 of the server 30 transmits the application program of the selected version to the client 50 (or, when a single version exists with respect to the application program concerned in Step S605, the control section 51 transmits the application program of this single version to the client 50), and, at the same time, stores the version information and the date-and-time information of the downloading operation, with respect to the downloaded application program, in the version controlling section 38, while correlating them with the client 50. Then, the client 50 receives the downloaded application program, and implements the version updating operation in Step S609.

As described in the foregoing, since the system embodied in the present invention is so constituted that the application programs are downloaded from the server 30, it becomes possible to select a version of the application program for every user. For instance, even when the application program of the latest version is already downloaded into the client 50, it becomes possible to cope with such a case that the user wishes to conduct data processing operation by employing the application program of its old version, resulting in an improvement of the convenience of the user.

Embodiment 4

Figure 16:
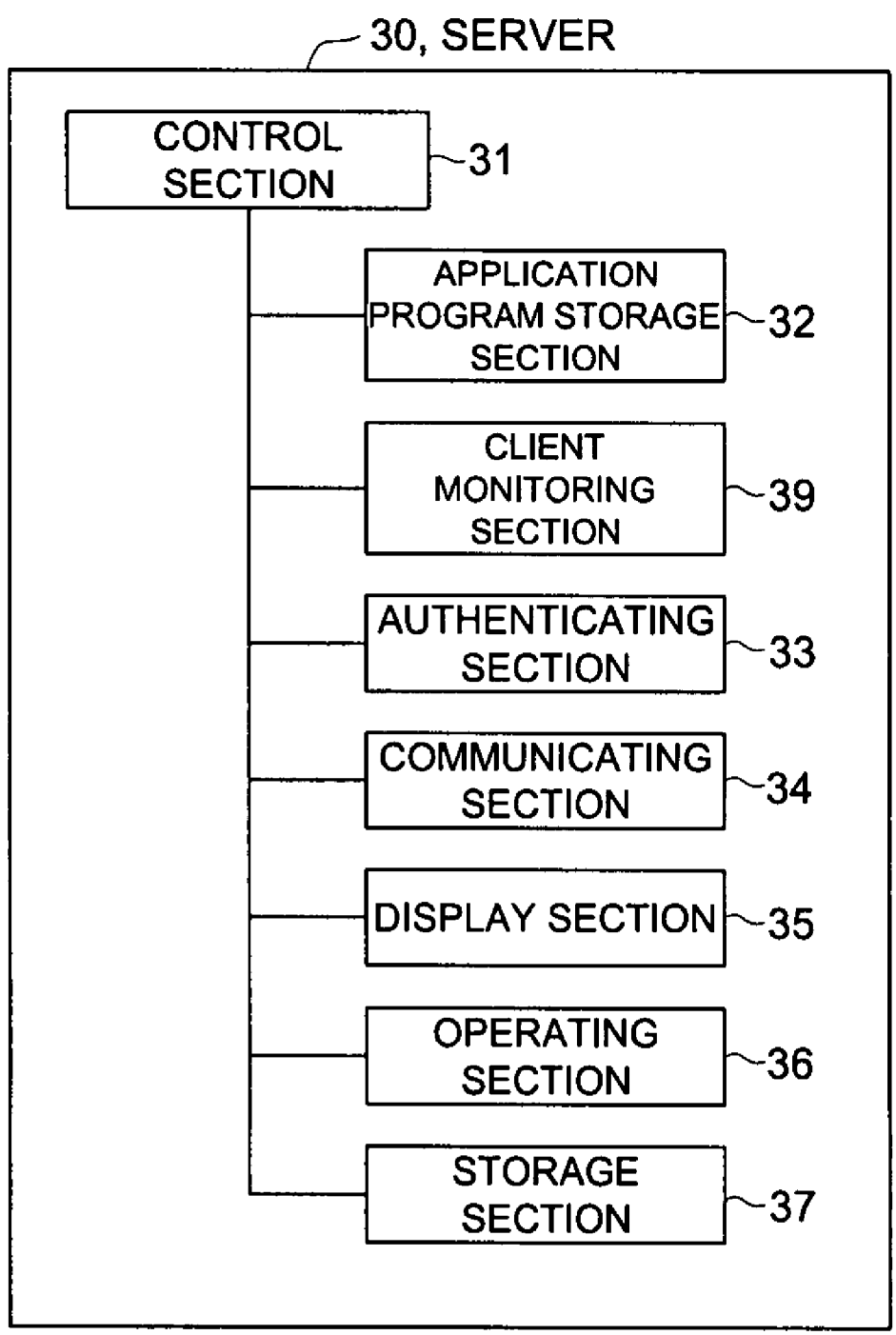
FIG. 16 shows a block diagram indicating a configuration of a server, embodied in the present invention as the fourth embodiment.
Figure 17:
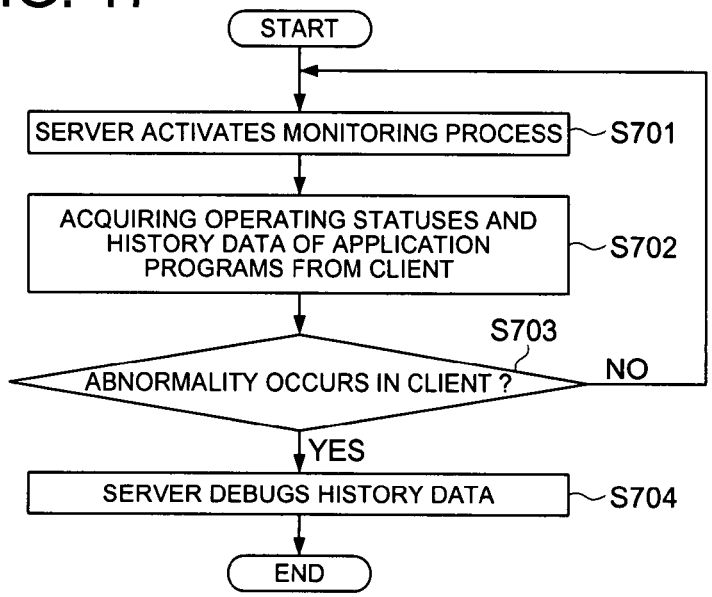
FIG. 17 shows a flowchart indicating a procedure for monitoring a client, to be conducted in a client/server type information processing system embodied in the present invention as the fourth embodiment.
Figure 18:
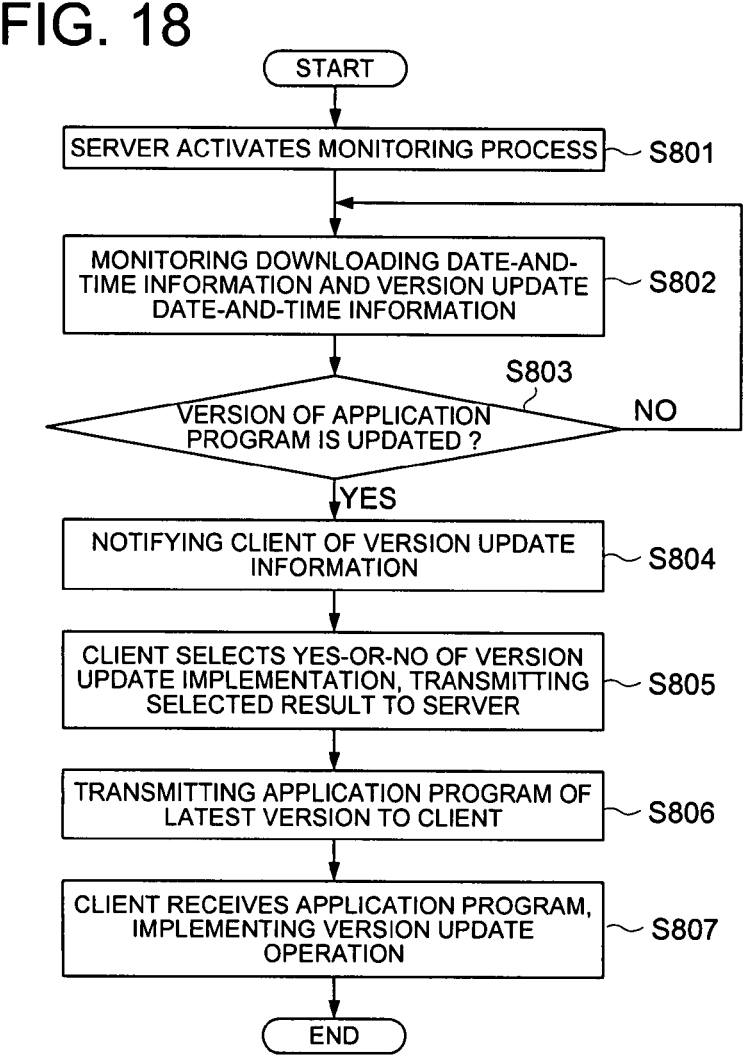
FIG. 18 shows a flowchart indicating a procedure for updating a version of an application program, to be conducted in a client/server type information processing system embodied in the present invention as the fourth embodiment.

Next, referring to FIG. 16 through FIG. 18, an image forming apparatus, a client/server type information processing system and an information processing method to be employed in the same, embodied in the present invention, will be detailed in the following as the fourth embodiment. FIG. 16 shows a block diagram indicating a configuration of the server of the fourth embodiment. Further, FIG. 17 shows a flowchart indicating a procedure for monitoring the client, while FIG. 18 shows a flowchart indicating a procedure for downloading the application program of the latest version into the client.

As shown in FIG. 16, in addition to the sections configured into the first embodiment, a client monitoring section 39 to monitor the statuses of the clients is provided in the server 30 of the fourth embodiment. Referring to the flowchart shown in FIG. 17, a procedure for monitoring the clients by employing the server 30, having the abovementioned configuration, will be detailed in the following.

At first, after the application programs are downloaded into the client 50 according to the flowchart of the first embodiment shown in FIG. 4, the control section 31 of the server 30 activates a monitoring process for every client 50, and makes the client monitoring section 39 function in Step S701.

The client monitoring section 39 is provided with a status grasping function for storing statistics data of operating statuses of the application programs in the client 50 and history data during the operating time of the client 50 in a real time, and acquires the operating statuses of the application programs and the history data from the client 50 in Step S702.

Successively, when an operating abnormality occurs in the client 50 in Step S703, the client monitoring section 39 instantaneously makes a debagging section, provided in the server 30 side, process the operating abnormality in the Step S704.

Still successively, the client monitoring section 39 transmits the result of the debagging operation conducted according to the abovementioned procedure to the development foothold apparatus 20 coupled to the server 30 through the communication network 40. Further, the client monitoring section 39 transmits the operating status data to the development foothold apparatus 20, coupled to the server 30 through the communication network 40, for instance, at the first day of every month, so that the development foothold apparatus 20 can analyze the using pattern of the user based on the operating status data.

As mentioned in the above, by employing the client monitoring section 39 for monitoring the client 50, it becomes possible to speedily cope with the occurrence of the operating abnormality. In addition, it also becomes possible to download the application program of the latest version into the client 50 by employing the client monitoring section 39. Referring to the flowchart shown in FIG. 18, the procedure of the abovementioned feature will be detailed in the following.

At first, after the application programs are downloaded into the client 50 according to the flowchart of the first embodiment shown in FIG. 4, the control section 31 of the server 30 activates a monitoring process for every client 50, and makes the client monitoring section 39 function in Step S801.

Successively, in Step S802, the client monitoring section 39 monitors the downloading date-and-time information indicating a time when the application program is downloaded into the client 50 and the version update date-and-time information indicating a time when the version of the application program is updated in the server 30, and, in Step S803, determines whether or not the version of the application program is updated in the server 30 after the previous downloading operation is completed, when the application program is selected in the client 50 side.

Still successively, when determining that the version of the application program is updated after the previous downloading operation is completed, the control section 31 of the server 30 employs the communicating section 34 to notify the client 50 of the version update information in Step S804, while, in Step S805, the control section 51 of the client 50 controls the display section 55 to display the version update information on the screen, so as to inquiry the Yes-or-No of the version update implementation from the user. Then, if the user selects the implementation of the version update, the control section 51 employs the communicating section 54 to notify the server 30 of the selected result.

Still successively, in Step S806, receiving the notification from the client 50, the control section 31 of the server 30 transmits the application program of the latest version to the client 50. Then, in Step S807, the client 50 receives the application program downloaded, and then, implements the version update operation.

Incidentally, although the control section 51 inquiries the Yes-or-No of the version update implementation from the user in the abovementioned embodiment, it is also applicable that the system is so constituted that the application program of the latest version is automatically downloaded into the client 50, if the version of the application program is updated after the previous downloading operation is completed. Further, although the downloading date-and-time information and the version update date-and-time information are compared with each other in the abovementioned embodiment, it is also applicable that the system is so constituted that the version information of the application program stored in the server 30 is compared with the version information of the application program stored in the client 50.

As mentioned in the above, since the client monitoring section 39 is provided in the server 30 so as to monitor the version of the application program in the client 50, it is possible to automatically update the version of the application program in the client 50 when the version of the application program in the server 30 is updated. Accordingly, it becomes possible not only to make the version update operation easy, but also to set the client 50 at an appropriate state.

Embodiment 5

Figure 19:
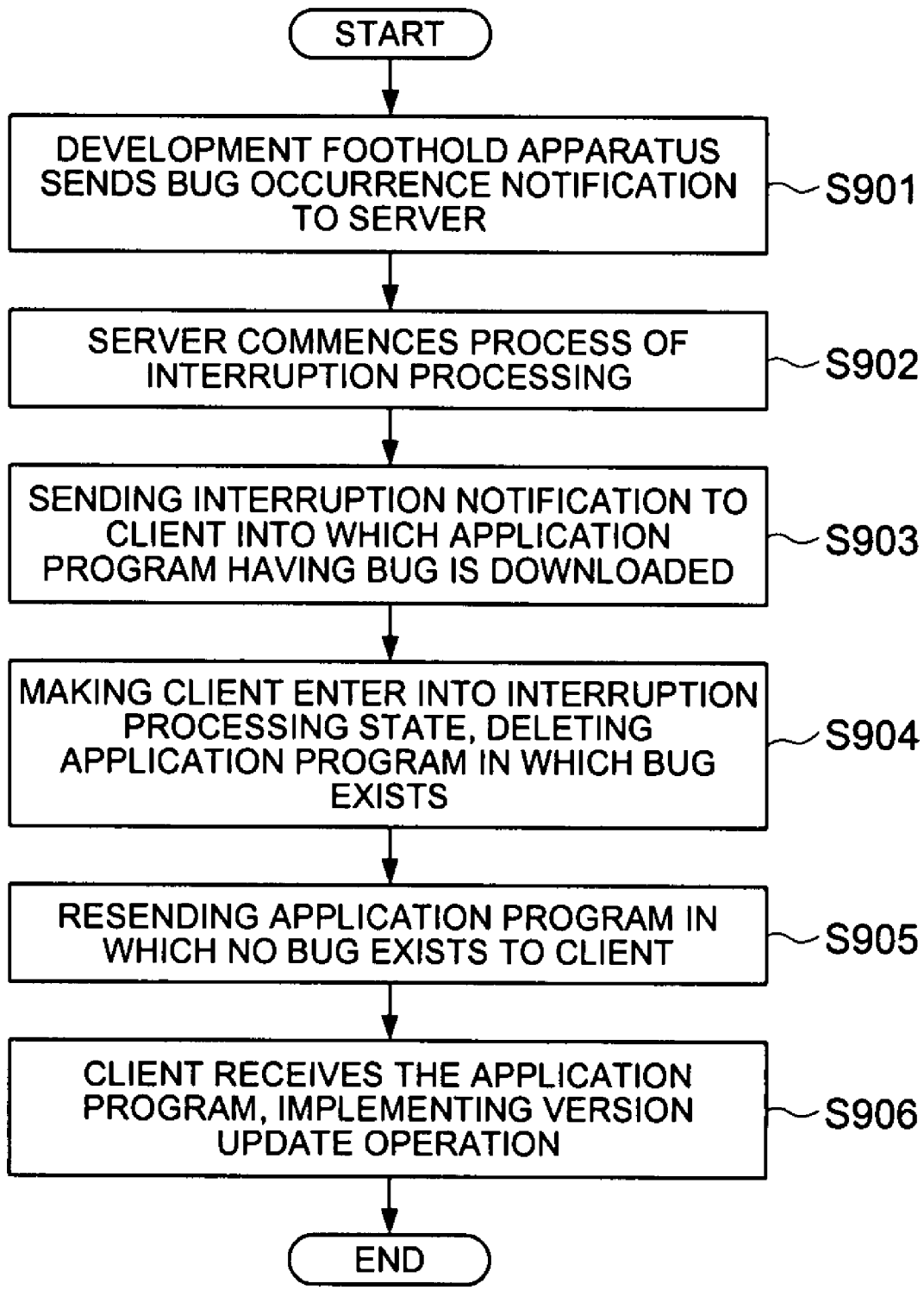
FIG. 19 shows a flowchart indicating a procedure for processing a bug in an application program, to be conducted in a client/server type information processing system embodied in the present invention as the fifth embodiment.

Next, referring to FIG. 19, an image forming apparatus, a client/server type information processing system and an information processing method to be employed in the same, embodied in the present invention, will be detailed in the following as the fifth embodiment. FIG. 19 shows a flowchart indicating a procedure for processing a bug in the application program.

In the fifth embodiment, when the manager of the server 30 receives a report of a certain fatal bug, the processing to be applied to such the fatal bug will be described in the following, referring to the flowchart shown in FIG. 19.

At first, when a fatal bug in the application program is found in the development foothold area, the development foothold apparatus 20 sends a bug occurrence notification to the server 30, and, at the same time, transmits the application program of the other version for which no report of bug occurrence exists in Step S901.

Successively, in Step S902, the control section 31 of the server 30 commences a process of an interruption processing, and then, in Step S903, the control section 31 specifies a specific client 50 into which the application program having the bug is downloaded, in order to send an interruption notification to the client 50 concerned.

Still successively, in Step S904, receiving the interruption notification, the control section 51 of the client 50 makes the client 50 enter into the interruption processing state, and thereafter, deletes the application program in which the bug exists.

Still successively, in Step S905, the control section 31 of the server 30 employs the communicating section 34 to resend the application program of the other version, for which no report of bug occurrence exists, to the client 50, while the control section 51 of the client 50 employs the communicating section 54 to receive the application program concerned, and implements its version update operation, in Step S906.

As mentioned in the above, since the system of the fifth embodiment is so constituted that the application programs are downloaded into the client 50 from the server 30, it is possible to sequentially update the application programs by notifying the client 50 of the interruption processing, when bugs occur in the application programs. Accordingly, it becomes possible not only to make the processing for defects easy, but also to set the client 50 at an appropriate state.

Embodiment 6

Figure 20:
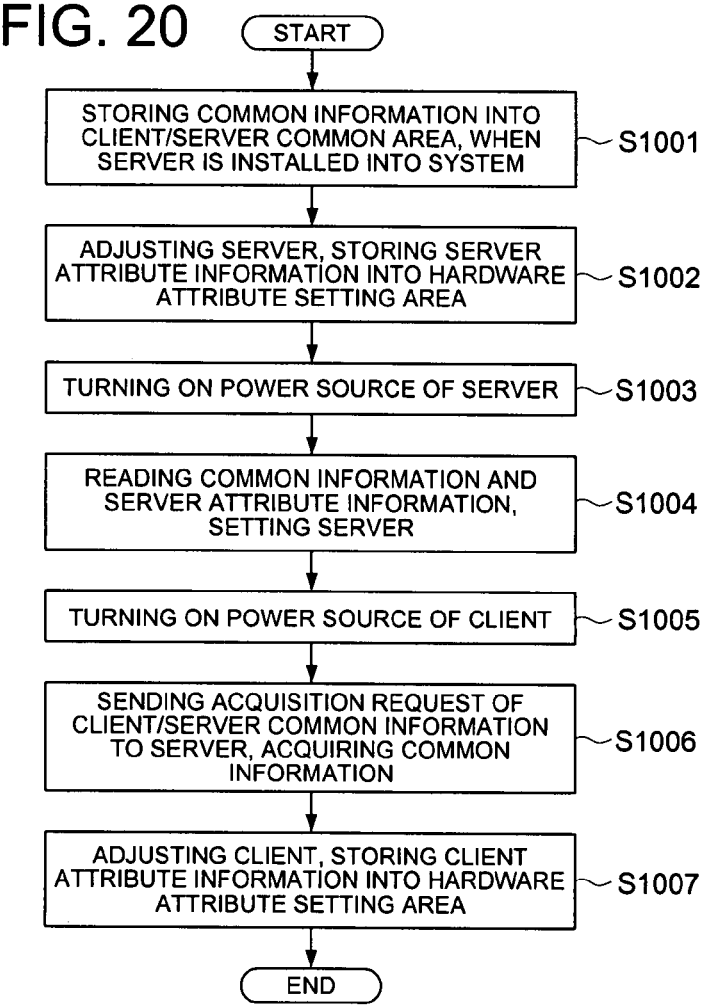
FIG. 20 shows a flowchart indicating a procedure for setting various kinds of information, to be conducted in a client/server type information processing system embodied in the present invention as the sixth embodiment.

Next, referring to FIG. 20, an image forming apparatus, a client/server type information processing system and an information processing method to be employed in the same, embodied in the present invention, will be detailed in the following as the sixth embodiment. FIG. 20 shows a flowchart indicating a procedure for setting various kinds of information in the client/server type information processing system embodied in the present invention.

Initially, in Step S1001, common information (for instance, a telephone number for the service call, etc.) are stored in a client/server common area of a nonvolatile storage provided in the server 30, at the time when the server 30 is installed into the system. Further, in Step S1002, adjustments inherent to the server are implemented. Concretely speaking, setting values inherent to the server, such as a value of reverse/obverse adjustment, etc., are stored into, for instance, a hardware attribute setting area of the nonvolatile storage.

Successively, when the server 30 is activated in Step S1003, the common information, stored in the client/server common area, and the setting values, being inherent to the server and stored into the hardware attribute setting area, are read out, to implement the setting operation of the server 30 in Step S1004.

Still successively, when the client 50 is activated in Step S1005, the control section 51 employs the communicating section 54 to sends the acquisition request of the client/server common information to the server 30, and then, receives the common information sent from the client/server common area of the server 30 in Step S1006.

Still successively, in Step S1007, the adjusting operations inherent to the client are implemented by employing the common information, and then, the setting values inherent to the client are stored into the hardware attribute setting area of the nonvolatile storage.

Still successively, when the client 50 is reactivated, after receiving the common information sent from the client/server common area of the server 30, the setting values inherent to the client are read out from the hardware attribute setting area, so as to implement the setting operation of the client 50.

As mentioned in the above, by storing the information common to both the server 30 and the client 50 into the server 30, while, by storing only the setting values inherent to the client into the client 50, it becomes impossible for the client 50 proper to adjust the devices configured into itself. Therefore, it becomes possible to prevent the leakage of the information when the client 50 is stolen. In addition, it becomes also possible not only to simplify the configuration of the client 50, but also to make the setting change of the information common to the clients in the system, resulting in a cost reduction of the system.

Embodiment 7

Figure 21:
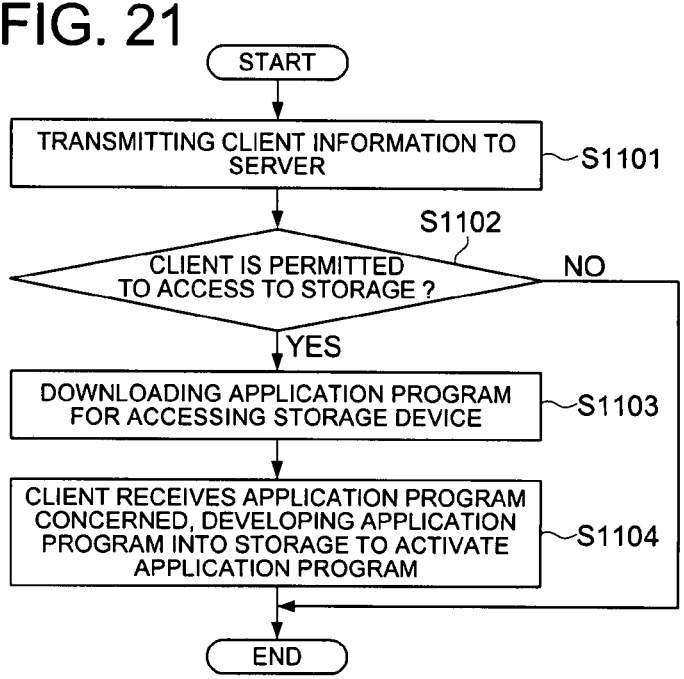
FIG. 21 shows a flowchart indicating a procedure for downloading an application program for accessing storage into a client, to be conducted in a client/server type information processing system embodied in the present invention as the seventh embodiment.

Next, referring to FIG. 21, an image forming apparatus, a client/server type information processing system and an information processing method to be employed in the same, embodied in the present invention, will be detailed in the following as the seventh embodiment. FIG. 21 shows a flowchart indicating a procedure for downloading an application program for accessing storage into the client.

In the following explanations, it is assumed that the first client 50 is capable of using the USB (Universal Serial Bus) storage device, while the second client 50 is incapable of using the USB storage device, and the setting information indicating capability-or-incapability of using the external storage device, in respect to each client 50, are stored in advance into the storage section 37 of the server 30.

At first, in Step S1101, when the power source of the client 50 turns ON, the control section 51 of the client 50 reads out the client information and the server information stored in advance into the information storing section 53, and employs the communicating section 54 to transmit the client information to the server 30.

Successively, in Step S1102, based on the setting information indicating capability-or-incapability of using the external storage device and stored in advance in the storage section 37, the control section 31 of the server 30 determines whether or not the client 50 specified by the client information is permitted to access to the storage.

Still successively, when determining that the client 50 is not permitted to access to the storage (namely, when the specified client 50 is the second client 50), the control section 31 finalizes the processing, while, when determining that the client 50 is permitted to access to the storage (namely, when the specified client 50 is the first client 50), the control section 31 downloads the application program for accessing the USB storage device, which is stored in advance in the application program storage section 32, into the client 50, in Step S1103.

Still successively, in Step S1104, the control section 51 of the first client 50 employs the communicating section 54 to receive the application program for accessing the USB storage device, and then, develops the receive application program for accessing the USB storage device in the RAM (Random Access Memory), etc., so as to activate the application program.

Still successively, a read/write functional button for accessing the USB storage device is displayed on the display section 55 of the first client 50. On the other hand, the read/write functional button for accessing the USB storage device is not displayed on the display section 55 of the second client 50 into which the application program for accessing the USB storage device is not downloaded.

As mentioned in the above, according to the seventh embodiment, since capability-or-incapability of using an external storage device, such as the USB storage device, etc., is established for every client 50 in advance, so that the application program for accessing the external storage device is downloaded only into a specific client 50, which is permitted to use the external storage, so as to make the application program available in the specific client 50, it becomes possible not only to restrict the takeout of the data, but also to suppress the leakage of the information.

In this connection, although capability-or-incapability of using an external storage device is established for every client 50 in the seventh embodiment mentioned in the above, it is also possible to establish the abovementioned capability-or-incapability for every client 50 so as to download the application program for accessing the external storage device when the user, who is permitted in advance to use the external storage device, accesses. According to this configuration, it becomes possible to improve the convenience of the user. Further, although the USB storage device is exemplified as the external storage device in the seventh embodiment mentioned in the above, other kinds of storage devices, such as a smart media, a Compact Flash (Registered trade mark), a Memory Stick (Registered trade mark), a SD memory card, a multimedia card, etc., can be also applied to the embodiment of present invention, as well.

Embodiment 8

Figure 22:
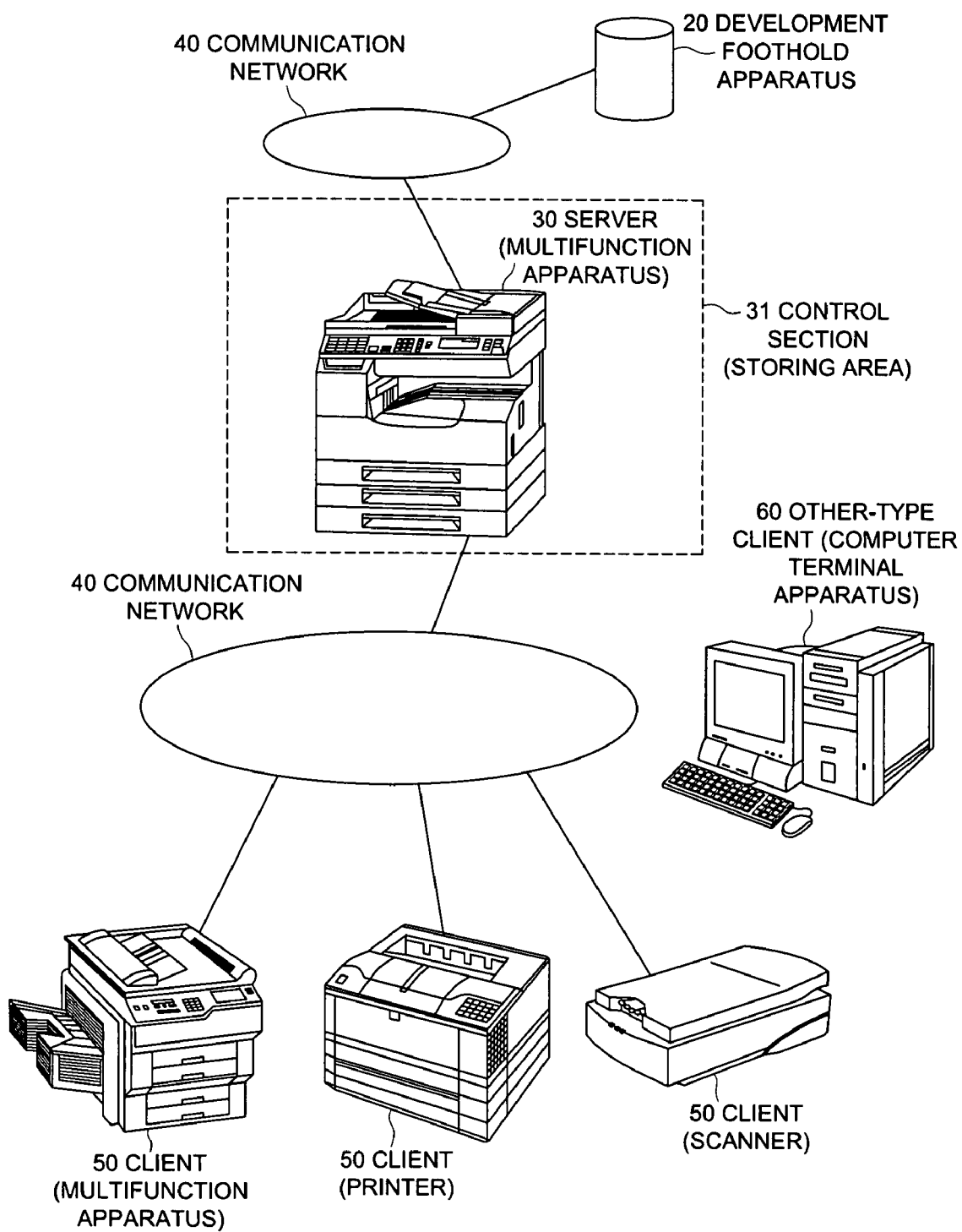
FIG. 22 shows a schematic diagram of a configuration of a client/server type information processing system, embodied in the present invention as the eighth embodiment.
Figure 23:
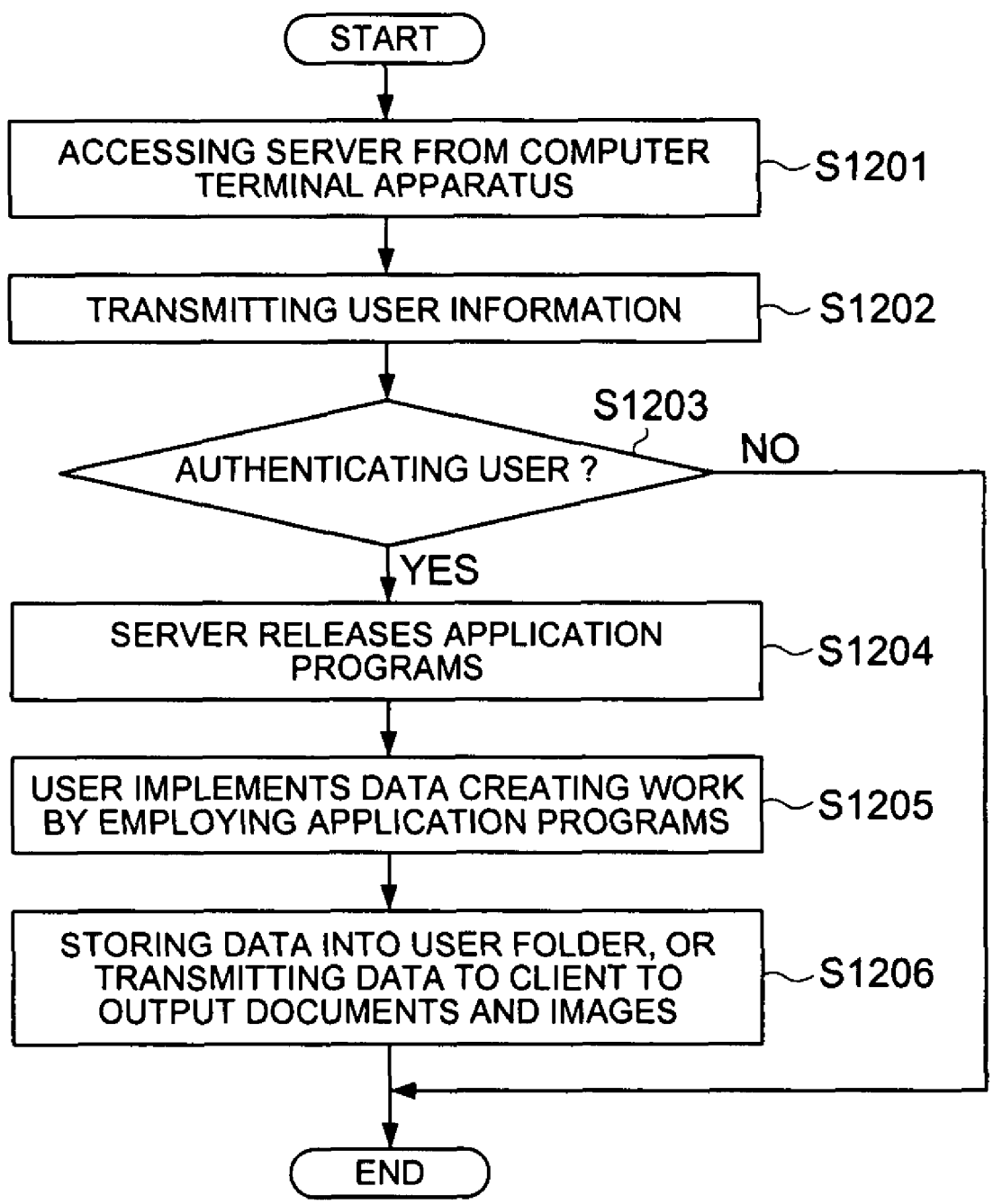
FIG. 23 shows a flowchart indicating a procedure for processing data, to be conducted in a client/server type information processing system embodied in the present invention as the eighth embodiment.

Next, referring to FIG. 22 and FIG. 23, an image forming apparatus, a client/server type information processing system and an information processing method to be employed in the same, embodied in the present invention, will be detailed in the following as the eighth embodiment. FIG. 22 shows a schematic diagram of the configuration of the client/server type information processing system embodied in the present invention, while FIG. 23 shows a flowchart indicating a procedure for processing data.

As shown in FIG. 22, the client/server type information processing system 10 serving as the eighth embodiment is characterized in that, in addition to the structural apparatuses included in the system configuration of the first embodiment shown in FIG. 1, another-type client 60, such as a computer terminal apparatus provided with no device, etc., is coupled to the communication network 40, so as to employ the other-type client 60 to process the data. Referring to the flowchart shown in FIG. 23, the operations of the eighth embodiment will be detailed in the following.

At first, the user employs the other-type client 60, such as the computer terminal apparatus, etc., to couple it to the server 30 in Step S1201, and inputs the user information from the operating section of the other-type client 60, so as to transmit the inputted user information to the server 30 in Step S1202.

Successively, in Step S1203, the authenticating section 33 of the server 30 authenticates the user by comparing the received user information with that registered in advance in the storage section 37.

Still successively, when the user cannot be authenticated, the server 30 finalizes the processing, while, when the user is successfully authenticated, the server 30 releases the application programs for editing documents and images to the user concerned in Step S1204. Then, the user implements the data creating work by employing the application programs in Step S1205.

Yet successively, in Step S1206, at the time when the work of the user is completed, the server 30 stores the data created into the user folder of the storage section 37, or transmits the created data to the predetermined client 50, so as to output the documents and images from the client 50 concerned.

As mentioned in the above, according to the eighth embodiment, since the application programs stored in the server 30 are released to the computer terminal apparatus provided with no device, so as to make it possible to create the data by employing the application programs, it becomes possible to improve the convenience of the user.

Incidentally, in each of the embodiments described in the foregoing, the image forming apparatus provided with devices, such as a printer, a finisher, a scanner, etc., is exemplified as the client 50. However, the scope of the present invention is not limited to the embodiments aforementioned, but the present invention can be also applied to such an arbitral client/server type information processing system and information processing method that includes arbitral devices for processing the data and in which the application programs for activating those devices are downloaded from the server.

According to the image forming apparatus, the client/server type information processing system and the information processing method embodied in the present invention, the following effects can be attained.

As the first effect of the present invention, it becomes possible to securely prevent a leakage of the information when the client is stolen. This is because, since the application program is downloaded into the client from the server every time when a power source of the client turns ON, and the application program is deleted from the client every time when a power source of the client turns OFF, it is impossible for a thief to conduct the data processing even if the client itself is stolen by the thief. Further, since the data are correctively handled in the server side, while the processed data created in the client side are deleted after the data processing is completed, the processed data cannot be leaked from the client even if the client itself is stolen. Still further, by storing the information common to all of the clients into the server side, and by storing the information inherent to each client into the client side, the adjusting operation of the client cannot be conducted, even if the client itself is stolen. Therefore, it becomes possible to prevent a leakage of the information.

Further, as the second effect of the present invention, it becomes possible to achieve the cost reduction of the system. This is because, since the system is so constituted that the application programs are downloaded into the client from the server, it is unnecessary to install the application programs into the client in advance, and therefore, it becomes possible to provide a low cost client (for instance, only a scanner function serving as a part of a copier, only a printer function, etc.). Further, since only the application program necessary to the device configured in the client is downloaded into the client from the server, other unnecessary application programs should not be downloaded. Still further, by storing the information common to all of the clients into the server side, and by storing the information inherent to each client into the client side, it becomes possible not only to simplify the configuration of the client, but also to make the setting change of the information common to all of the clients easy.

Still further, as the third effect of the present invention, it becomes possible to set the client at an optimum state. This is because, the server can always grasp the using status of the client and can provide an application program of an appropriate version among the plurality of application programs of various versions stored in the server, and further, even when a version of a certain application program stored in the server is updated, the server can transmit the application program of its latest version to the client. In addition, even in such a case that a fatal error has been included in the application program at the time of the version updating operation, by changing the version of the application program or by deleting the application program concerned, it becomes possible to exclude such the fatal error without individually applying countermeasures to all of the clients in the system, and therefore, it becomes possible to easily cope with the defects and the version updating operation of the application programs.

Yet further, as the fourth effect of the present invention, it becomes possible to improve a convenience of the user who uses the client. This is because, since the version of the application programs to be utilized by the user can be set for every user, it becomes possible for the user to implement the processing by employing the application program of the desired version.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus that serves as a client coupled to a server through a communication network and includes at least a device for processing data, wherein none of application programs for activating the device are installed in advance, the image forming apparatus comprising:
    a communicating section to communicate with the server;
    a device information acquiring section to acquire device information for specifying the device;
    an information storing section to store server information for specifying the server and client information for specifying the client itself; and
    a control section to transmit the device information, acquired by the device information acquiring section, and the client information, stored in the information storing section, to the server specified by the server information through the communicating section, in order to request the server to send an application program corresponding to the device information back to the client;
    wherein, when the control section receives the application program from the server, the control section develops the application program into a storage so as to make the device available.

2. The image forming apparatus of claim 1,
    wherein, every time when a power source of the image forming apparatus turns ON, the control section receives the application program from the server and develops the application program into the storage, while, every time when a power source of the image forming apparatus turns OFF, the control section deletes the application program from the storage.

3. The image forming apparatus of claim 1,
    wherein the control section deletes processed data created by employing the application program in the client, after transmitting the processed data to the server.

4. The image forming apparatus of claim 1,
    wherein the device is either a printer or a scanner.

5. The image forming apparatus of claim 1,
    wherein the device is an external storage device; and
    wherein, when the external storage device is coupled to the image forming apparatus, the control section receives the application program corresponding to the external storage device from the server and develops the application program into the storage, while, when the external storage device is released from the image forming apparatus, the control section deletes the application program from the storage.

6. A client/server type information processing system, comprising:
- a communication network through which various kinds of information are communicated;
- an image forming apparatus serving as a client and coupled to the communication network; and
- a server coupled to the communication network so as to bilaterally communicate with the image forming apparatus through the communication network;
- wherein the image forming apparatus, serving as the client, includes:
  - a device to process data, wherein none of application programs for activating the device are installed in advance;
  - a client-attributed communicating section to communicate with the server;
  - a device information acquiring section to acquire device information for specifying the device;
  - an information storing section to store server information for specifying the server and client information for specifying the client itself; and
  - a client-attributed control section to transmit the device information, acquired by the device information acquiring section, and the client information, stored in the information storing section, to the server specified by the server information through the client-attributed communicating section; and
- wherein the server includes:
  - a server-attributed communicating section to communicate with the client;
  - an application program storage section to store a plurality of various application programs including an application program corresponding to the device information;
  - an authenticating section to authenticate the client or a user who uses the client; and
  - a server-attributed control section to specify the application program corresponding to the device information from the plurality of various application programs stored in the application program storage section, in order to transmit the application program corresponding to the device information to the client through the server-attributed communicating section; and
- wherein, when the client-attributed control section receives the application program from the server, the client-attributed control section develops the application program into a storage so as to make the device available.

7. The client/server type information processing system of claim 6,
- wherein, every time when a power source of the image forming apparatus, serving as the client, turns ON, the client-attributed control section receives the application program from the server and develops the application program into the storage, while, every time when a power source of the image forming apparatus, serving as the client, turns OFF, the client-attributed control section deletes the application program from the storage.

8. The client/server type information processing system of claim 6,
- wherein the client-attributed control section deletes processed data created by employing the application program in the client, after transmitting the processed data to the server.

9. The client/server type information processing system of claim 8,
- wherein the server stores the processed data, transmitted from the client, into a data storage section, while correlating the processed data with user information, and reads out the processed data from the data storage section by employing the user information.

10. The client/server type information processing system of claim 6,
- wherein the server compares version information of a specific application program, included in the plurality of various application programs currently stored in the application program storage section, with that of the specific application program previously downloaded into the client; and
- wherein, when the version information of the specific application program currently stored in the application program storage section is later than that of the specific application program previously downloaded into the client, the server transmits the specific application program currently stored in the application program storage section to the client.

11. The client/server type information processing system of claim 6,
- wherein the server compares a first date-and-time when a version of a specific application program, included in the plurality of various application programs stored in the application program storage section, is updated, with a second date-and-time when the specific application program is downloaded into the client; and
- wherein, when the first date-and-time is later than the second date-and-time, the server transmits the specific application program stored in the application program storage section to the client.

12. The client/server type information processing system of claim 6,
- wherein application programs corresponding to a plurality of different versions are stored in the server, with respect to every client or every user; and
- wherein the server-attributed control section transmits a list of application programs for every client or for every user to the client through the server-attributed communicating section, while, the client-attributed control section displays the list of application programs received from the server on a display screen in a user-selectable mode.

13. The client/server type information processing system of claim 6,
- wherein, with respect to every client or every user, an external storage device is connectable to the client, and setting information of a usage permission of the external storage device are stored in the server; and
- wherein the server-attributed control section transmits a specific application program for making the external storage device available for either the client or the user, authenticated by the authenticating section, to the client through the server-attributed communicating section.

14. The client/server type information processing system of claim 6, further comprising:
- a computer terminal apparatus serving as the client;
- wherein the server-attributed control section permits the computer terminal apparatus, which is authenticated by the authenticating section, to use a specific application program included in the plurality of various application programs stored in the application program storage section; and wherein the computer terminal apparatus employs the specific application program for processing data on the server.

15. The client/server type information processing system of claim 6, wherein the device is either a printer or a scanner.

16. An information processing method to be employed in a client/server type information processing system that includes a communication network through which various kinds of information are communicated, an image forming apparatus serving as a client and coupled to the communication network, and a server coupled to the communication network so as to bilaterally communicate with the image forming apparatus through the communication network, the method comprising:

acquiring device information for specifying a device configured into the client, to store the device information in the client;

transmitting the device information, acquired by the client, and client information for specifying the client to the server from the client;

authenticating the client based on the client information received form the client in the server;

specifying an application program corresponding to the device information from a plurality of various application programs stored in advance in the server, so as to transmit the application program to the client; and developing the application program into a storage of the client, so as to make the application program available for the client.

17. The information processing method of claim 16, wherein, every time when a power source of the image forming apparatus, serving as the client, turns ON, the client receives the application program from the server and develops the application program into the storage, while, every time when a power source of the image forming apparatus, serving as the client, turns OFF, the client deletes the application program from the storage.

18. The information processing method of claim 16, wherein the client deletes processed data created by employing the application program in the client, after transmitting the processed data to the server.

19. The information processing method of claim 16, wherein the server compares version information of a specific application program, included in the plurality of various application programs currently stored in the server, with that of the specific application program previously downloaded into the client; and wherein, when the version information of the specific application program currently stored in the server is later than that of the specific application program previously downloaded into the client, the server transmits the specific application program currently stored in the server to the client.

20. The information processing method of claim 16, wherein the server compares a first date-and-time when a version of a specific application program, included in the plurality of various application programs stored in the server, is updated, with a second date-and-time when the specific application program is downloaded into the client; and wherein, when the first date-and-time is later than the second date-and-time, the server transmits the specific application program stored in the server to the client.

21. The information processing method of claim 16, further comprising:

storing application programs corresponding to a plurality of different versions in the server, with respect to every client or every user;

transmitting a list of application programs for every client or for every user to the client from the server;

displaying the list of application programs received from the server on a display screen of the client in a user-selectable mode, so as to make it possible to select a specific application program of a specific version; and transmitting the specific application program of the specific version selected in the displaying step to the client from the server.

22. The information processing method of claim 16, wherein, with respect to every client or every user, an external storage device is connectable to the client, and setting information of a usage permission of the external storage device are stored in the server; and wherein the server transmits a specific application program for making the external storage device available for either the client or the user, authenticated in the authenticating step, to the client.

23. The information processing method of claim 16, wherein the client/server type information processing system further includes a computer terminal apparatus serving as the client; and wherein the server permits the computer terminal apparatus, which is authenticated in the authenticating step, to use a specific application program included in the plurality of various application programs stored in the server; and wherein the computer terminal apparatus employs the specific application program for processing data on the server.

24. The information processing method of claim 16, wherein the device is either a printer or a scanner.

* * * * *